US012777526B2

(12) United States Patent
Lee et al.

(10) Patent No.: US 12,777,526 B2
(45) Date of Patent: Oct. 27, 2026

(54) ELECTRONIC DEVICE FOR CONTROLLING ANTENNA SETTING AND OPERATING METHOD THEREOF

(71) Applicant: Samsung Electronics Co., Ltd., Suwon-si (KR)

(72) Inventors: Youngkwon Lee, Suwon-si (KR); Hyungjoon Yu, Suwon-si (KR); Myungjin Kang, Suwon-si (KR); Jongho Park, Suwon-si (KR); Jongphil Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 489 days.

(21) Appl. No.: 18/469,233

(22) Filed: Sep. 18, 2023

(65) Prior Publication Data

US 2024/0098800 A1 Mar. 21, 2024

Related U.S. Application Data

(63) Continuation of application No. PCT/KR2023/013580, filed on Sep. 11, 2023.

(30) Foreign Application Priority Data

Sep. 19, 2022 (KR) ........................ 10-2022-0117923
Sep. 29, 2022 (KR) ........................ 10-2022-0124620
Dec. 29, 2022 (KR) ........................ 10-2022-0188828

(51) Int. Cl.
*H04W 74/0833* (2024.01)
*H04W 52/34* (2009.01)
*H04W 72/0453* (2023.01)

(52) U.S. Cl.
CPC ....... *H04W 74/0833* (2013.01); *H04W 52/34* (2013.01); *H04W 72/0453* (2013.01)

(58) Field of Classification Search
CPC ............. H04W 74/0833; H04W 52/34; H04W 72/0453; H04W 52/36; G06F 3/041; H04B 1/40
See application file for complete search history.

(56) References Cited

U.S. PATENT DOCUMENTS

2004/0235593 A1* 11/2004 DuFlon ................ A63B 67/002 473/570
2010/0331032 A1 12/2010 Lipka
(Continued)

FOREIGN PATENT DOCUMENTS

CN 108366388 8/2018
EP 3754857 A1 12/2020
(Continued)

OTHER PUBLICATIONS

Search Report dated Dec. 7, 2023 in International Application No. PCT/KR2023/013580.
(Continued)

*Primary Examiner* — Christine Ng
(74) *Attorney, Agent, or Firm* — Nixon & Vanderhye, P.C.

(57) ABSTRACT

An example electronic device includes at least one sensor including a grip sensor, at least one antenna, a radio frequency (RF) circuit including at least one antenna tuning circuit connected to the at least one antenna, and at least one communication processor operatively connected to the RF circuit. The at least one communication processor is configured to, control the RF circuit to transmit a random access preamble signal based on first transmission power and a first tuning value, identify whether a random access response (RAR) signal is received via the RF circuit in response to the random access preamble signal, identify whether a set condition is satisfied, based on the RAR signal not being received, change a tuning value of the at least one antenna
(Continued)

tuning circuit which corresponds to the grip sensor from the first tuning value to a second tuning value, based on the set condition being satisfied, and control the RF circuit to transmit the random access preamble signal based on the first transmission power or second transmission power and the second tuning value.

11 Claims, 15 Drawing Sheets

(56) References Cited

U.S. PATENT DOCUMENTS

| | | | | |
|---|---|---|---|---|
| 2011/0051609 | A1* | 3/2011 | Ishii | H04B 1/707 370/252 |
| 2011/0158104 | A1 | 6/2011 | Frenger et al. | |
| 2014/0335916 | A1* | 11/2014 | Thorson | G06F 1/1626 455/566 |
| 2016/0037453 | A1 | 2/2016 | Sivanadyan et al. | |
| 2016/0255591 | A1* | 9/2016 | Park | H04W 4/70 455/522 |
| 2016/0302080 | A1* | 10/2016 | Hwang | H04L 69/28 |
| 2016/0345351 | A1 | 11/2016 | Bhattacharjee et al. | |
| 2016/0373170 | A1* | 12/2016 | Szini | H04B 7/0632 |
| 2017/0007382 | A1 | 1/2017 | Goddard et al. | |
| 2017/0373890 | A1* | 12/2017 | Fertonani | H04L 25/02 |
| 2019/0028860 | A1 | 1/2019 | Futaki et al. | |
| 2019/0281624 | A1 | 9/2019 | Kim et al. | |
| 2019/0320430 | A1* | 10/2019 | Kim | H04W 72/51 |
| 2020/0187258 | A1* | 6/2020 | Lee | H04W 74/0833 |
| 2020/0305200 | A1* | 9/2020 | Jiang | H04W 36/0072 |
| 2021/0136649 | A1 | 5/2021 | Shah et al. | |
| 2021/0212123 | A1* | 7/2021 | Reial | H04B 7/0617 |
| 2022/0078875 | A1 | 3/2022 | Ou et al. | |
| 2022/0104274 | A1* | 3/2022 | Xu | H04W 74/0833 |
| 2022/0110169 | A1 | 4/2022 | Utkovski et al. | |
| 2022/0150038 | A1 | 5/2022 | Lee et al. | |
| 2022/0167201 | A1 | 5/2022 | Sun et al. | |
| 2022/0264477 | A1 | 8/2022 | Akkarakaran et al. | |
| 2022/0330375 | A1 | 10/2022 | Zhang et al. | |
| 2023/0023678 | A1 | 1/2023 | Lee et al. | |
| 2023/0090516 | A1* | 3/2023 | Zhang | G01S 13/56 370/328 |
| 2024/0259159 | A1* | 8/2024 | Demir | H04L 5/0051 |

FOREIGN PATENT DOCUMENTS

| | | | |
|---|---|---|---|
| JP | 2020511902 | A | 4/2020 |
| JP | 2021036679 | A | 3/2021 |
| KR | 10-2012-0092062 | | 8/2012 |
| KR | 10-2018-0096475 | | 8/2018 |
| KR | 20190085502 | A | 7/2019 |
| KR | 20210130063 | A | 10/2021 |
| KR | 20220033012 | A | 3/2022 |
| KR | 20220046637 | A | 4/2022 |
| KR | 20220048004 | A | 4/2022 |
| KR | 10-2022-0102433 | | 7/2022 |
| WO | 2016/111220 | | 7/2016 |

OTHER PUBLICATIONS

Written Opinion dated Dec. 7, 2023 in International Application No. PCT/KR2023/013580.

* cited by examiner

ELECTRONIC DEVICE FOR CONTROLLING ANTENNA SETTING AND OPERATING METHOD THEREOF

CROSS-REFERENCE TO RELATED APPLICATIONS

This application is a continuation of PCT/KR2023/013580, designating the United States, filed Sep. 11, 2023, in the Korean Intellectual Property Receiving Office, which claims priority to Korean Patent Application No. 10-2022-0117923, filed Sep. 19, 2022, in the Korean Intellectual Property Office; to Korean Patent Application No. 10-2022-0124620, filed Sep. 29, 2022, in the Korean Intellectual Property Office; and to Korean Patent Application No. 10-2022-0188828, filed Dec. 29, 2022, in the Korean Intellectual Property Office. The disclosures of each of these applications are incorporated herein in their entireties.

BACKGROUND

Field

The disclosure relates to an electronic device for controlling antenna setting and an operating method thereof.

Description of Related Art

Recently, as the use of portable terminals providing various functions has become common according to the development of mobile communication technology, efforts have been made to develop a $5^{th}$ generation (5G) communication system to meet the growing demand for wireless data traffic. The 5G communication system has been considered to be implemented in a higher frequency band (e.g., a band of 25 to 60 GHz) in addition to frequency bands used in a $3^{rd}$ generation (3G) communication system and a long term evolution (LTE) communication system in order to provide a higher data transmission speed for achieving a high data rate.

For example, in order to mitigate path loss of radio waves and increase a propagation distance of the radio waves in a millimeter wave (mmWave) band, a beamforming technology, a massive multiple-input multiple-output (MIMO) technology, a full dimensional MIMO (FD-MIMO) technology, an array antenna technology, an analog beamforming technology, and a large scale antenna technology have been discussed for use in the 5G communication system.

An electronic device is simplified for efficient use of a system, and an antenna is also required to be simplified while satisfying a high gain characteristic. The electronic device generates an electromagnetic wave, and transmission power of the antenna may be increased to improve a transmission performance of the antenna. A numerical value representing a degree to which the generated electromagnetic wave is absorbed by the human body is a specific absorption rate (SAR), and transmission power of the electronic device may be limited in order to satisfy regulatory standards for SAR.

The electronic device may include a grip sensor, and the grip sensor may be used to sense a change in an electric charge of a metal part of the antenna, and may recognize an approach of or a proximity of a dielectric such as the human body. If the grip sensor recognizes the approach of or the proximity of the human body, transmission power of a signal transmitted from the electronic device may be maintained at a level which may satisfy the regulatory standards for SAR.

In order for the electronic device to transmit a signal to a communication network (e.g., a base station), data generated from a processor or a communication processor within the electronic device may be transmitted via at least one antenna after being processed through a radio frequency integrated circuit (RFIC), a radio frequency front end (RFFE), and an antenna tuning circuit.

If a dielectric approaches or is in proximity with at least one antenna, impedance of the at least one antenna may change, and a radio frequency (RF) performance may be degraded due to this. The electronic device uses an antenna tuning circuit to improve an RF performance in various scenarios. In this case, the electronic device may recognize the approach of or proximity of the dielectric to the antenna via the grip sensor, and operate the antenna tuning circuit to mitigate degradation in an RF performance due to the approach of or proximity of the dielectric.

The grip sensor consumes current when turned on, so the electronic device may turn on or turn off the grip sensor according to a state (e.g., a radio resource control (RRC) idle (RRC_IDLE) state, an RRC inactive (RRC_INACTIVE) state, or an RRC connected (RRC_CONNECTED) state) of the electronic device. To prevent current consumption due to turn-on of the grip sensor, the electronic device may turn off the grip sensor if the state of the electronic device is the RRC_IDLE state or the RRC_INACTIVE state, and may turn on the grip sensor if the state of the electronic device is the RRC_CONNECTED state.

As such, if the state of the electronic device is the RRC_IDLE state or the RRC_INACTIVE state, the grip sensor may be turned off. Therefore, the electronic device may not operate the antenna tuning circuit due to the approach of or proximity of the dielectric sensed by the grip sensor, and this may cause performance degradation in a reception operation of the electronic device, such as an operation of receiving a paging signal, and performance degradation in a transmission operation of the electronic device, such as a case in which the electronic device performs a random access procedure in the RRC_IDLE state.

SUMMARY

According to an example embodiment of the disclosure, an electronic device may include at least one sensor including a grip sensor, at least one antenna, a radio frequency (RF) circuit including at least one antenna tuning circuit connected to the at least one antenna, and at least one communication processor operatively connected to the RF circuit.

According to an example embodiment of the disclosure, the at least one processor may be configured to transit to a radio resource control (RRC) idle (RRC_IDLE) state or an RRC inactive (RRC_INACTIVE) state, and maintain a first tuning value which is a tuning value of the at least one antenna tuning circuit which corresponds to the grip sensor before transition to the RRC_IDLE state or the RRC_INACTIVE.

According to an example embodiment of the disclosure, the at least one processor may be further configured to control the RF circuit to transmit a random access preamble signal based on first transmission power and the first tuning value.

According to an example embodiment of the disclosure, the at least one processor may be further configured to identify whether a random access response (RAR) signal is received via the RF circuit in response to the random access preamble signal.

According to an example embodiment of the disclosure, the at least one processor may be further configured to identify whether a set condition is satisfied, based on the RAR signal not being received.

According to an example embodiment of the disclosure, the at least one processor may be further configured to change the tuning value from the first tuning value to a second tuning value, based on the set condition being satisfied.

According to an example embodiment of the disclosure, the at least one processor may be further configured to control the RF circuit to transmit the random access preamble signal based on the first transmission power and the second tuning value.

According to an example embodiment of the disclosure, an electronic device may include at least one sensor including a grip sensor, at least one antenna, a radio frequency (RF) circuit including at least one antenna tuning circuit connected to the at least one antenna, and at least one communication processor operatively connected to the RF circuit.

According to an example embodiment of the disclosure, the at least one processor may be configured to control the RF circuit to transmit a random access preamble signal based on first transmission power and a first tuning value.

According to an example embodiment of the disclosure, the at least one processor may be further configured to identify whether a random access response (RAR) signal is received via the RF circuit in response to the random access preamble signal.

According to an example embodiment of the disclosure, the at least one processor may be further configured to identify whether a set condition is satisfied, based on the RAR signal not being received.

According to an example embodiment of the disclosure, the at least one processor may be further configured to change a tuning value of the at least one antenna tuning circuit which corresponds to the grip sensor from the first tuning value to a second tuning value, based on the set condition being satisfied.

According to an example embodiment of the disclosure, the at least one processor may be further configured to control the RF circuit to transmit the random access preamble signal based on the first transmission power and the second tuning value.

According to an example embodiment of the disclosure, an operating method of an electronic device may include transiting to a radio resource control (RRC) idle (RRC_IDLE) state or an RRC inactive (RRC_INACTIVE) state.

According to an example embodiment of the disclosure, the operating method may further include maintaining a first tuning value which is a tuning value of at least one antenna tuning circuit which corresponds to a grip sensor before transition to the RRC_IDLE state or the RRC_INACTIVE.

According to an example embodiment of the disclosure, the operating method may further include transmitting a random access preamble signal based on first transmission power and the first tuning value.

According to an example embodiment of the disclosure, the operating method may further include identifying whether a random access response (RAR) signal is received in response to the random access preamble signal.

According to an example embodiment of the disclosure, the operating method may further include identifying whether a set condition is satisfied, based on the RAR signal not being received.

According to an example embodiment of the disclosure, the operating method may further include changing the tuning value from the first tuning value to a second tuning value, based on the set condition being satisfied.

According to an example embodiment of the disclosure, the operating method may further include transmitting the random access preamble signal based on the first transmission power and the second tuning value.

According to an example embodiment of the disclosure, an operating method of an electronic device may include transmitting a random access preamble signal based on first transmission power and a first tuning value.

According to an example embodiment of the disclosure, the operating method may further include identifying whether a random access response (RAR) signal is received via the RF circuit in response to the random access preamble signal.

According to an example embodiment of the disclosure, the operating method may further include identifying whether a set condition is satisfied, based on the RAR signal not being received.

According to an example embodiment of the disclosure, the operating method may further include changing a tuning value of at least one antenna tuning circuit which corresponds to a grip sensor from the first tuning value to a second tuning value, based on the set condition being satisfied.

According to an example embodiment of the disclosure, the operating method may further include transmitting the random access preamble signal based on the first transmission power and the second tuning value.

According to an example embodiment, a non-transitory computer readable storage medium may include one or more programs, the one or more programs including instructions configured to, when executed by at least one processor of an electronic device, cause the electronic device to transit to a radio resource control (RRC) idle (RRC_IDLE) state or an RRC inactive (RRC_INACTIVE) state.

According to an example embodiment, the instructions may be further configured to cause the electronic device to maintain a first tuning value which is a tuning value of at least one antenna tuning circuit which corresponds to a grip sensor before transition to the RRC_IDLE state or the RRC_INACTIVE.

According to an example embodiment, the instructions may be further configured to cause the electronic device to transmit a random access preamble signal based on first transmission power and the first tuning value.

According to an example embodiment, the instructions may be further configured to cause the electronic device to identify whether a random access response (RAR) signal is received in response to the random access preamble signal.

According to an example embodiment, the instructions may be further configured to cause the electronic device to identify whether a set condition is satisfied, based on the RAR signal not being received.

According to an example embodiment, the instructions may be further configured to cause the electronic device to change the tuning value from the first tuning value to a second tuning value, based on the set condition being satisfied.

According to an example embodiment, the instructions may be further configured to cause the electronic device to transmit the random access preamble signal based on the first transmission power and the second tuning value.

According to an example embodiment, a non-transitory computer readable storage medium may include one or more programs, the one or more programs including instructions configured to, when executed by at least one processor of an electronic device, cause the electronic device to transmit a random access preamble signal based on first transmission power and a first tuning value.

According to an example embodiment, the instructions may be further configured to cause the electronic device to identify whether a random access response (RAR) signal is received via the RF circuit in response to the random access preamble signal.

According to an example embodiment, the instructions may be further configured to cause the electronic device to identify whether a set condition is satisfied, based on the RAR signal not being received.

According to an example embodiment, the instructions may be further configured to cause the electronic device to change a tuning value of at least one antenna tuning circuit which corresponds to a grip sensor from the first tuning value to a second tuning value, based on the set condition being satisfied.

According to an example embodiment, the instructions may be further configured to cause the electronic device to transmit the random access preamble signal based on the first transmission power and the second tuning value.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
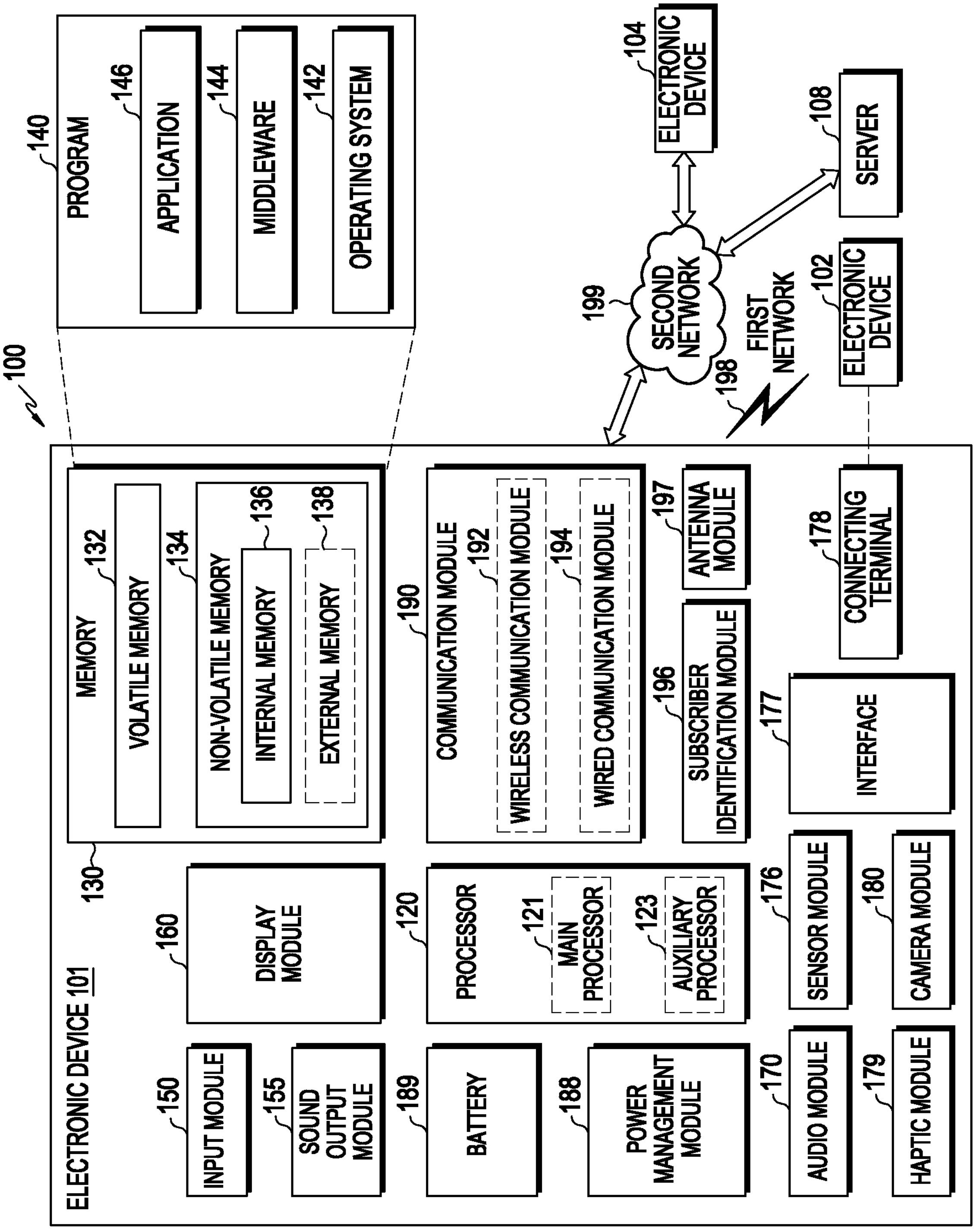
FIG. 1 is a block diagram illustrating an example electronic device in a network environment according to various embodiments.

Hereinafter, various example embodiments of the disclosure will be described in detail with reference to the accompanying drawings. In the disclosure, a detailed description of known functions or configurations incorporated herein will be omitted when the description may make the subject matter of an example embodiment of the disclosure unnecessarily unclear. The terms which will be described below are terms defined in consideration of the functions in the disclosure, and may be different according to users, intentions of the users, or customs. Therefore, the definitions of the terms should be made based on the contents throughout the disclosure.

It should be noted that the technical terms used herein are only used to describe specific example embodiments, and are not intended to limit embodiments of the disclosure. The technical terms used herein should be interpreted to have the same meaning as those commonly understood by a person skilled in the art to which the disclosure pertains, and should not be interpreted have excessively comprehensive or excessively restricted meanings unless particularly defined as other meanings. When the technical terms used herein are wrong technical terms that cannot correctly represent the idea of the disclosure, it should be appreciated that they are replaced by technical terms correctly understood by those skilled in the art. The general terms used in example embodiments of the disclosure should be interpreted as defined in dictionaries or interpreted in the context of the relevant part, and should not be interpreted to have excessively restricted meanings.

A singular expression used herein may include a plural expression unless they are definitely different in the context. As used herein, such an expression as “comprises” or “include”, or the like should not be interpreted to necessarily include all elements or all operations described in the specification, and should be interpreted to be allowed to exclude some of them or further include additional elements or operations.

Terms including an ordinal number, such as “a first” and “a second” may be used to describe various elements, but the corresponding elements should not be limited by such terms.

These terms are used merely to distinguish between one element and any other element. For example, a first element may be termed a second element, and similarly, a second element may be termed a first element without departing from the scope of the disclosure.

It should be understood that when an element is referred to as being "connected" or "coupled" to another element, it may be connected or coupled directly to the other element, or any other element may be interposed between them. In contrast, it should be understood that when an element is referred to as being "directly connected" or "directly coupled" to another element, there are no elements interposed between them.

Hereinafter, example embodiments of the disclosure will be described in detail with reference to the accompanying drawings. The same or similar elements are provided with the same reference numeral, and a description thereof will not be repeated. In describing example embodiments of the disclosure, a detailed description of known technologies will be omitted when it is determined that such description may make the subject matter of the disclosure unclear. The accompanying drawings are presented merely to help easy understanding of the technical ideas of the disclosure, and should not be construed to limit the technical ideas of the disclosure. The technical ideas of the disclosure should be construed to cover all changes, equivalents, and alternatives, in addition to the drawings.

Hereinafter, an electronic device will be described in various embodiments of the disclosure. The electronic device may be referred to, for example, as a terminal, a mobile station, a mobile equipment (ME), a user equipment (UE), a user terminal (UT), a subscriber station (SS), a wireless device, a handheld device, an access terminal (AT), or the like. In various example embodiments of the disclosure, the electronic device may be a device having a communication function such as, for example, a mobile phone, a personal digital assistant (PDA), a smart phone, a wireless MODEM, and a notebook.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of, the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof, but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of, the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of or including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to an embodiment, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to an embodiment may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with an embodiment of the disclosure, the term "module" may include a unit implemented in hardware, software, or firmware, or combinations thereof, and may interchangeably be used with other terms, for example, "logic," "logic block," "part," or "circuitry". A module may be a single integral component, or a minimum unit or part thereof, adapted to perform one or two or more functions. For example, according to an embodiment, the module may be implemented in a form of an application-specific integrated circuit (ASIC).

An embodiment as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium, wherein the term "non-transitory" refers to the storage medium being a tangible device, and does not include a signal (e.g., an electromagnetic wave), but this term does not differentiate between data being semi-permanently stored in the storage medium and data being temporarily stored in the storage medium.

According to an embodiment, a method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities, and some of the multiple entities may be separately disposed in different components. According to an embodiment, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

Figure 2A:
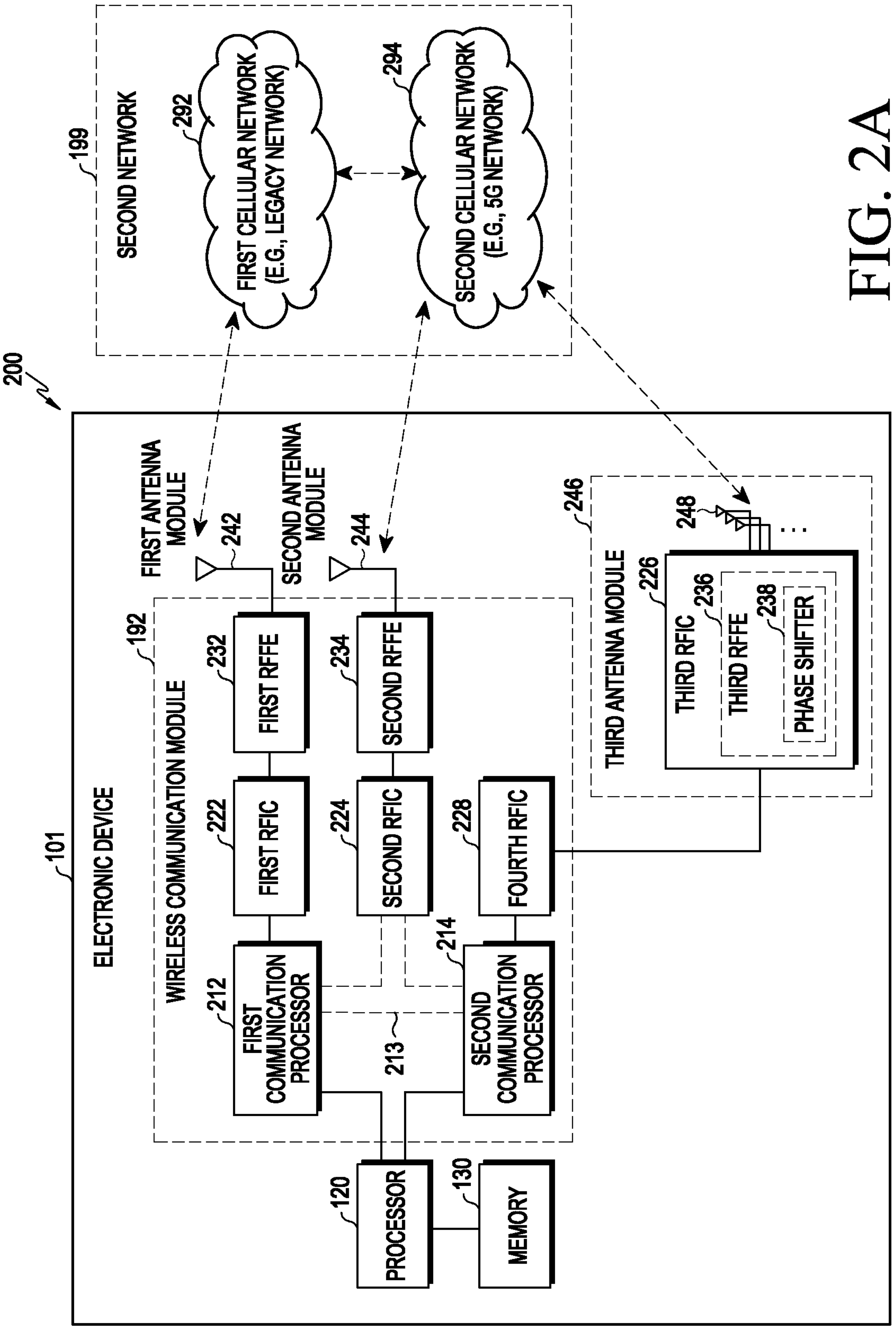
FIG. 2A is a block diagram illustrating an example electronic device for supporting a legacy network communication and a 5$^{th}$ generation (5G) network communication according to various embodiments.

FIG. 2A is a block diagram 200 illustrating an example electronic device 101 for supporting a legacy network communication and a 5$^{th}$ generation (5G) network communication according to various embodiments.

Referring to FIG. 2A, an electronic device 101 (e.g., an electronic device 101 in FIG. 1) may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, a third antenna module 246, and antennas 248. The electronic device 101 may further include a processor 120 and a memory 130. A second network 199 may include a first cellular network 292 and a second cellular network 294. According to an embodiment, the electronic device 101 may further include at least one of the components illustrated in FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may form at least part of a wireless communication module 192. According to an embodiment, the fourth RFIC 228 may be omitted or included as part of the third RFIC 226.

The first communication processor 212 may establish a communication channel in a band to be used for a wireless communication with the first cellular network 292 and support a legacy network communication via the established communication channel. According to an embodiment, the first cellular network 292 may be a legacy network including a 2$^{nd}$ generation (2G) network, a 3$^{rd}$ generation (3G) network, a 4$^{th}$ generation (4G) network, or a long term evolution (LTE) network. The second communication processor 214 may establish a communication channel corresponding to a specified band (e.g., about 6 GHz to about 60 GHz) out of a band to be used for a wireless communication with the second cellular network 294 and support a 5G network communication via the established communication channel According to an embodiment, the second cellular network 294 may be a 5G network defined by the 3$^{rd}$ generation partnership project (3GPP). Additionally, according to an embodiment, the first communication processor 212 or the second communication processor 214 may establish a communication channel corresponding to another specified band (e.g., about 6 GHz or less) out of the band to be used for the wireless communication with the second cellular network 294 and support a 5G network communication via the established communication channel.

The first communication processor 212 may transmit and receive data to and from the second communication processor 214. For example, data supposed to be transmitted via the second cellular network 294 may be scheduled to be transmitted via the first cellular network 292. In this case, the first communication processor 212 may receive transmission data from the second communication processor 214. For example, the first communication processor 212 may transmit and receive data to and from the second communication processor 214 via an inter-processor interface 213. The inter-processor interface 213 may be implemented as, for example, a universal asynchronous receiver/transmitter (UART) (e.g., high speed-UART (HS-UART)) or a peripheral component interconnect bus express (PCIe) interface, but a type thereof is not limited. Alternatively, the first communication processor 212 and the second communication processor 214 may exchange control information and packet data information using, for example, a shared memory. The first communication processor 212 may transmit and receive various pieces of information such as sensing information, information about output strength, and resource block (RB) allocation information to and from the second communication processor 214.

According to an embodiment, the first communication processor 212 may not be coupled directly to the second communication processor 214. In this case, the first communication processor 212 may transmit and receive data to and from the second communication processor 214 via the processor 120 (e.g., an application processor). For example, the first communication processor 212 and the second communication processor 214 may transmit and receive data to and from the processor 120 via an HS-UART interface or a PCIe interface, but a type of an interface is not limited. Alternatively, the first communication processor 212 and the second communication processor 214 may exchange control information and packet data information using, for example, the processor 120 and the shared memory.

Figure 2B:
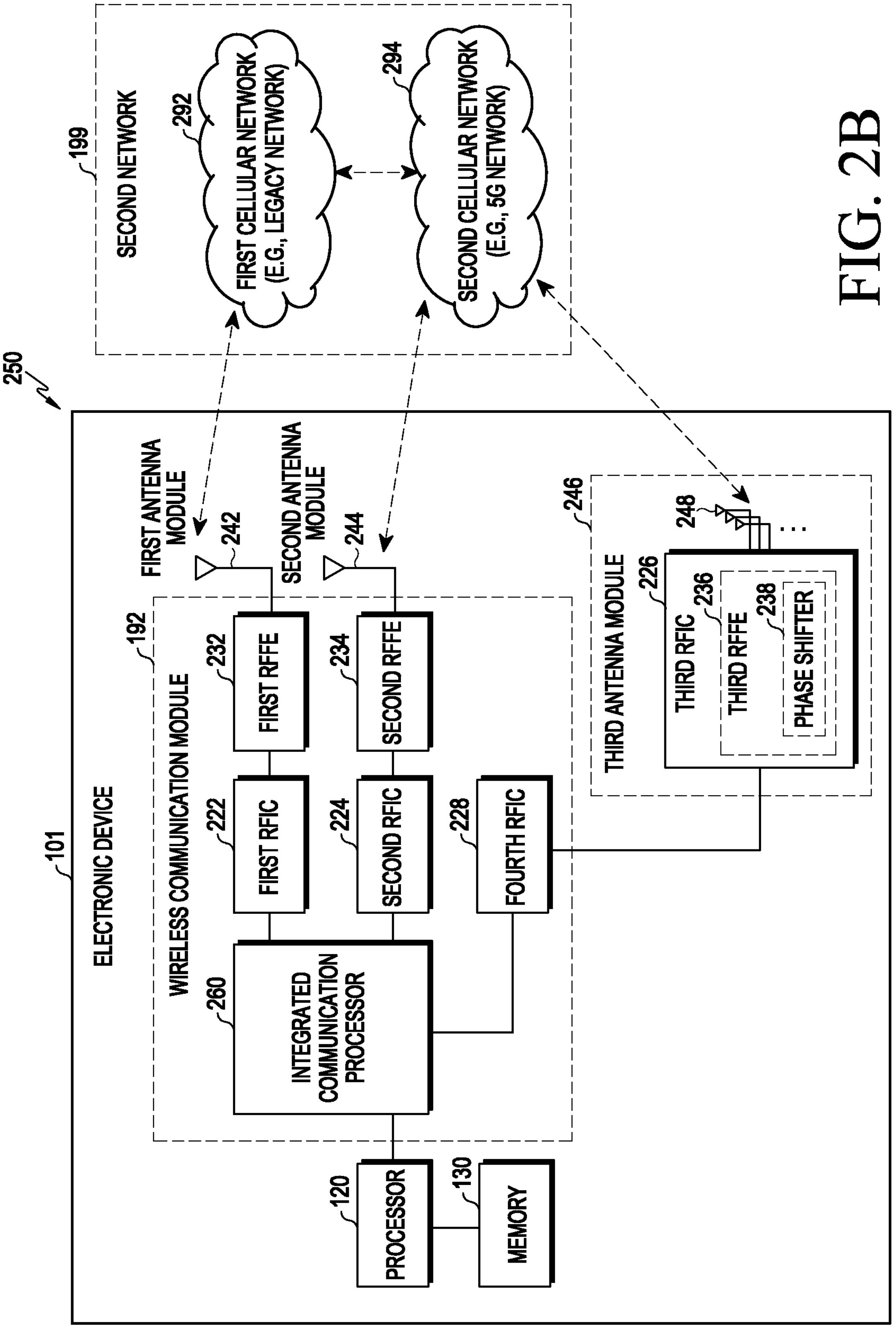
FIG. 2B is a block diagram illustrating an example electronic device for supporting a legacy network communication and a 5G network communication according to various embodiments.

According to an embodiment, the first communication processor 212 and the second communication processor 214 may be incorporated in a single chip or a single package. According to an embodiment, the first communication processor 212 or the second communication processor 214 may be incorporated together with the processor 120, an auxiliary processor 123, or a communication module 190 in a single chip or a single package. For example, as illustrated in FIG. 2B, an integrated communication processor 260 may support all of a function for a communication with the first cellular network 292 and a function for a communication with the second cellular network 294.

For transmission, the first RFIC 222 may convert a baseband signal generated by the first communication processor 212 to a radio frequency (RF) signal in about 700 MHz to about 3 GHz used in the first cellular network 292 (e.g., the legacy network). For reception, an RF signal may be obtained from the first cellular network 292 via an antenna (e.g., the first antenna module 242) and pre-processed via an RFFE, (e.g., the first RFFE 232). The first RFIC 222 may convert the pre-processed RF signal to a baseband signal so that the baseband signal may be processed by the first communication processor 212.

For transmission, the second RFIC 224 may convert a baseband signal generated by the first communication processor 212 or the second communication processor 214 to an RF signal in a Sub6 band (e.g., about 6 GHz or less) used in the second cellular network 294 (e.g., the 5G network). For reception, a 5G Sub6 RF signal may be obtained from the second cellular network 294 via an antenna (e.g., the second antenna module 244) and pre-processed in an RFFE (e.g., the second RFFE 234). The second RFIC 224 may convert the pre-processed 5G Sub6 RF signal to a baseband signal so that the baseband signal may be processed by a corresponding one between the first communication processor 212 and the second communication processor 214.

For transmission, the third RFIC 226 may convert a baseband signal generated by the second communication processor 214 to an RF signal (hereinafter, referred to as, a 5G Above6 RF signal) in a 5G Above6 band (e.g., about 6 GHz to about 60 GHz) used in the second cellular network 294. For reception, a 5G Above6 RF signal may be obtained from the second cellular network 294 via an antenna (e.g., the antenna 248) and pre-processed via the third RFFE 236. The third RFIC 226 may convert the pre-processed 5G Above6 RF signal to a baseband signal so that the baseband signal may be processed by the second communication processor 214. According to an embodiment, the third RI-PE 236 may be formed as part of the third RFIC 226.

According to an embodiment, the electronic device 101 may include the fourth RFIC 228 separately from or as part of the third RFIC 226. In this case, the fourth RFIC 228 may convert a baseband signal generated by the second communication processor 214 to an RF signal in an intermediate frequency band (e.g., about 9 GHz to about 11 GHz) (hereinafter, referred to as an intermediate frequency (IF) signal), and provide the IF signal to the third RFIC 226. The third RFIC 226 may convert the IF signal to a 5G Above6 RF signal. During reception, a 5G Above6 RF signal may be received from the second cellular network 294 through an antenna (e.g., the antenna 248) and converted to an IF signal by the third RFIC 226. The fourth RFIC 228 may convert the IF signal to a baseband signal so that the baseband signal may be processed by the second communication processor 214.

According to an embodiment, the first RFIC 222 and the second RFIC 224 may be implemented as at least part of a single chip or a single package. According to an embodiment, if the first RFIC 222 and the second RFIC 224 are implemented as a single chip or a single package in FIG. 2A or 2B, the first RFIC 222 and the second RFIC 224 may be implemented as an integrated RFIC. In this case, the integrated RFIC is connected to the first RI-PE 232 and the second RFFE 234, so the integrated RFIC may convert a baseband signal into a signal of a band supported by the first RFFE 232 and/or the second RFFE 234, and transfer the converted signal to one of the first RFFE, 232 and the second RFFE 234. According to an embodiment, the first RFFE 232 and the second RFFE 234 may be implemented as at least part of a single chip or a single package. According to an embodiment, at least one of the first antenna module 242 or the second antenna module 244 may be omitted or combined with the other antenna module to process RF signals in a plurality of corresponding bands.

According to an embodiment, the third RFIC 226 and the antenna 248 may be arranged on the same substrate to form a third antenna module 246. For example, the wireless communication module 192 or the processor 120 may be arranged on a first substrate (e.g., a main PCB). In this case, the third RFIC 226 may be arranged in a partial area (e.g., the bottom surface) of a second substrate (e.g., a sub PCB) other than the first substrate and the antenna 248 may be arranged in another partial area (e.g., the top surface) of the second substrate, to form the third antenna module 246. As the third RFIC 226 and the antenna 248 are arranged on the same substrate, it is possible to reduce length of a transmission line between the third RFIC 226 and the antenna 248. This may reduce, for example, loss (e.g., attenuation) of a signal in a high frequency band (e.g., about 6 GHz to about 60 GHz) used for a 5G network communication, on the transmission line. Therefore, the electronic device 101 may increase quality or a speed of a communication with the second cellular network 294 (e.g., the 5G network).

According to an embodiment, the antenna 248 may be formed as an antenna array including a plurality of antenna elements which may be used for beamforming. In this case, for example, the third RFIC 226 may include a plurality of phase shifters 238 corresponding to the plurality of antenna elements, as part of the third RFFE 236. During transmission, each of the plurality of phase shifters 238 may change a phase of a 5G Above6 RF signal to be transmitted to the outside of the electronic device 101 (e.g., a base station in the 5G network) via a corresponding antenna element. During reception, each of the phase shifters 238 may change a phase of a 5G Above6 RF signal received from the outside via a corresponding antenna element to the same or substantially same phase. This enables transmission or reception via beamforming between the electronic device 101 and the outside.

The second cellular network 294 may be operated independently of the first cellular network 292 (e.g., stand-alone (SA)) or in connection to the first cellular network 292 (e.g., non-stand alone (NSA)). For example, in the 5G network, only an access network (e.g., a 5G radio access network (RAN) or next generation RAN (NG RAN)) may exist, and a core network (e.g., a next generation core (NGC)) may not exist. In this case, after accessing the access network of the 5G network, the electronic device 101 may access an external network (e.g., an Internet) under the control of a core network (e.g., an evolved packet core (EPC)) of the legacy network. Protocol information for a communication with the legacy network (e.g., LTE protocol information) and protocol information for a communication with the 5G network (e.g., new radio (NR) protocol information) may be stored in the memory 230 and accessed by another component (e.g., the processor 120, the first communication processor 212, or the second communication processor 214).

FIG. 2B is a block diagram 250 illustrating an example electronic device for supporting a legacy network communication and a 5G network communication according to various embodiments.

Referring to FIG. 2B, an electronic device 101 (e.g., an electronic device 101 in FIG. 1) may include an integrated communication processor 260, a first RFIC 222, a second RFIC 224, a third RFIC 226, a fourth RFIC 228, a first RFFE 232, a second RFFE 234, a first antenna module 242, a second antenna module 244, a third antenna module 246, and/or antennas 248. The electronic device 101 may further include a processor 120 and a memory 130. A second network 199 may include a first cellular network 292 and a second cellular network 294.

In the block diagram 250 of the electronic device 101 shown in FIG. 2B comparing to the block diagram 200 of the electronic device 101 shown in FIG. 2A, it differs in that the first communication processor 212 and the second communication processor 214 are implemented as the integrated communication processor 260, and the remaining components included in the block diagram 250 of the electronic device 101 may be implemented similarly or substantially the same as the components included in the block diagram 200 of the electronic device 101 shown in FIG. 2A, so a detailed description thereof will not be repeated.

Figure 3A:
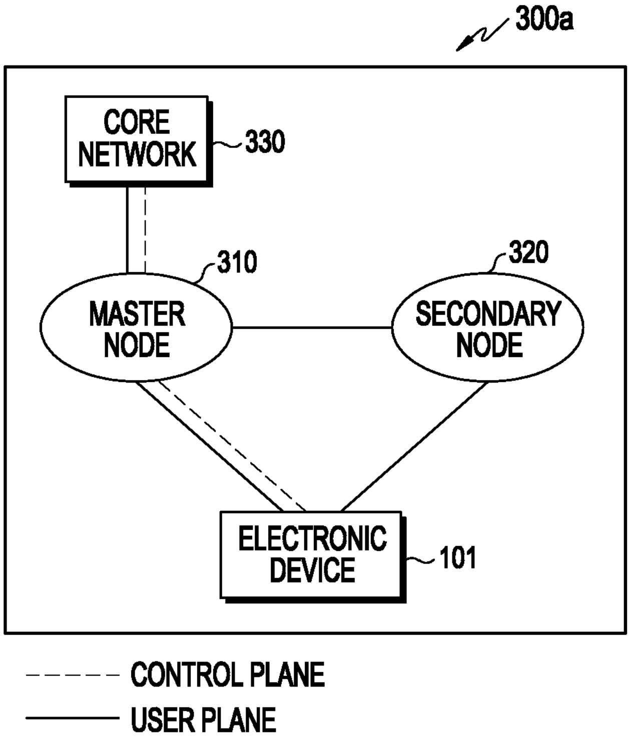
FIG. 3A is a diagram illustrating an example wireless communication system which provides a legacy communication network and/or a 5G communication network.

FIG. 3A is a diagram illustrating an example wireless communication system which provides a legacy communication network and/or a 5G communication network.

Referring to FIG. 3A, a network environment 300*a* may include at least one of a legacy network or a 5G network. In an embodiment, the legacy network may include a 4G or LTE base station (e.g., an eNodeB (eNB)) of the 3GPP standard supporting a wireless access of an electronic device 101 (e.g., an electronic device 101 in FIG. 1, 2A, or 2B), and an EPC which manages a 4G communication. The 5G network may include an NR base station (e.g., a gNodeB (gNB)) supporting a wireless access of the electronic device 101, and a 5GC which manages a 5G communication of the electronic device 101.

According to an embodiment, the electronic device 101 may transmit and receive a control message and user data via a legacy communication and/or 5G communication. The control message may include a message related to at least one of security control, bearer setup, authentication, registration, or mobility management of the electronic device 101. The user data may refer, for example, to user data except for a control message transmitted and received between the electronic device 101 and a core network 330 (e.g., the EPC).

The electronic device 101 may transmit and receive at least one of a control message or user data to and from at least part (e.g., an NR base station and a 5GC) of the 5G network using at least part (e.g., an LTE base station and an EPC) of the legacy network.

According to an embodiment, the network environment 300*a* may include a network environment which provides dual connectivity (DC) to the LTE base station and the NR base station and transmits and receives a control message to and from the electronic device 101 via one core network 330 of the EPC or the 5GC.

According to an embodiment, in a DC environment, one of the LTE base station and the NR base station may operate as a master node (MN) 310 and the other may operate as a secondary node (SN) 320. The MN 310 may be connected to the core network 330 and transmit and receive a control message to and from the core network 330. The MN 310 and the SN 320 may be connected to each other via a network interface and transmit and receive a message related to management of a wireless resource (e.g., a communication channel) to and from each other.

According to an embodiment, the MN 310 may include the LTE base station, the SN 320 may include the NR base station, and the core network 330 may include the EPC. For example, a control message may be transmitted and received via the LTE base station and the EPC, and user data may be transmitted via at least one of the LTE base station or the NR base station. According to an embodiment, the MN 310 may include the NR base station, the SN 320 may include the LTE base station, and the core network 330 may include the 5GC. For example, a control message may be transmitted and received via the NR base station and the 5GC, and user data may be transmitted via at least one of the LTE base station or the NR base station.

Figure 3B:
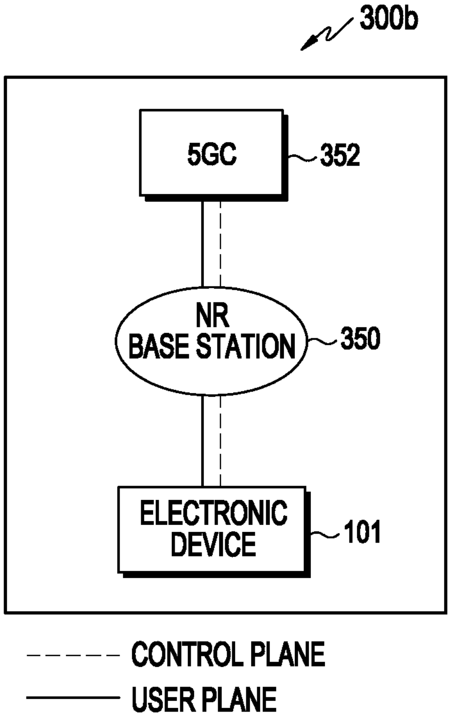
FIG. 3B is a diagram illustrating an example wireless communication system which provides a legacy communication network and/or a 5G communication network.

FIG. 3B is a diagram illustrating an example wireless communication system which provides a legacy communication network and/or a 5G communication network.

Referring to FIG. 3B, a network environment 300*b* may include at least one of a legacy network or a 5G network. In an embodiment, the legacy network may include a 4G or LTE base station (e.g., an eNodeB (eNB)) of the 3GPP standard supporting a wireless access of an electronic device 101 (e.g., an electronic device 101 in FIG. 1, 2A, or 2B), and an EPC which manages a 4G communication. The 5G network may include an NR base station 350 (e.g., a gNodeB (gNB)) supporting a wireless access of the electronic device 101, and a 5GC 352 which manages a 5G communication of the electronic device 101.

According to an embodiment, the electronic device 101 may transmit and receive a control message and user data through a legacy communication and/or a 5G communication. The 5G network may include an NR base station 350 and a 5GC 352, and may transmit and receive a control message and user data independently from the electronic device 101.

Figure 3C:
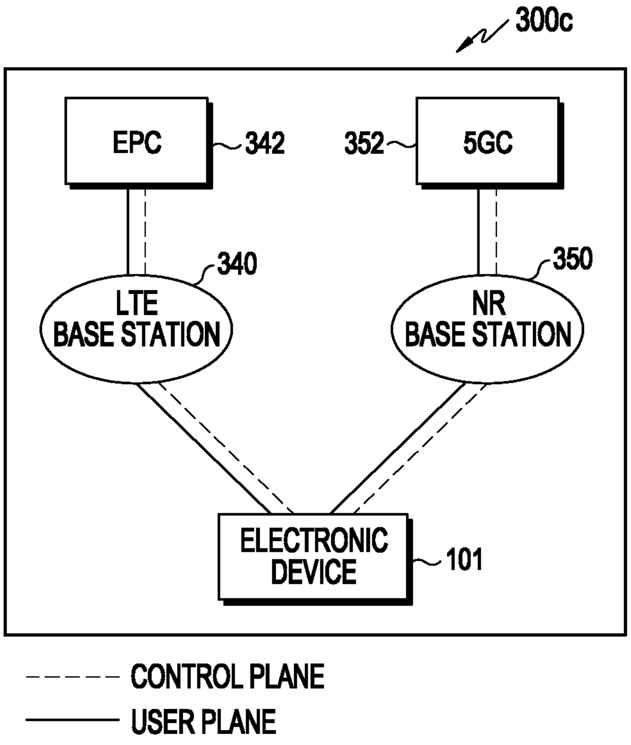
FIG. 3C is a diagram illustrating an example wireless communication system which provides a legacy communication network and/or a 5G communication network.

FIG. 3C is a diagram illustrating an example wireless communication system which provides a legacy communication network and/or a 5G communication network.

Referring to FIG. 3C, a network environment 300*c* may include at least one of a legacy network or a 5G network. In an embodiment, the legacy network may include a 4G or LTE base station 340 (e.g., an eNodeB (eNB)) of the 3GPP standard supporting a wireless access of an electronic device 101 (e.g., an electronic device 101 in FIG. 1, 2A, or 2B), and an EPC 342 which manages a 4G communication. The 5G network may include an NR base station 350 (e.g., a gNodeB (gNB)) supporting a wireless access of the electronic device 101, and a 5GC 352 which manages a 5G communication of the electronic device 101.

According to an embodiment, the electronic device 101 may transmit and receive a control message and user data through a legacy communication and/or a 5G communication.

Each of a legacy network and a 5G network according to an embodiment may independently provide data transmission and reception. For example, an electronic device 101 may transmit and receive a control message and user data to and from the EPC 342 via the LTE base station 340. For another example, the electronic device 101 may transmit and receive a control message and user data to and from the 5GC 352 via the NR base station 350.

According to an embodiment, the electronic device 101 may be registered in at least one of the EPC 342 or the 5GC 352, and transmit and receive a control message.

According to an embodiment, the EPC 342 and the 5GC 352 may interwork and manage a communication of the electronic device 101. For example, mobility information of the electronic device 101 may be transmitted and received via an interface between the EPC 342 and the 5GC 352.

As described above, DC through the LTE base station 340 and the NR base station 350 may be referred to as E-UTRA new radio dual connectivity (EN-DC).

Figure 4:
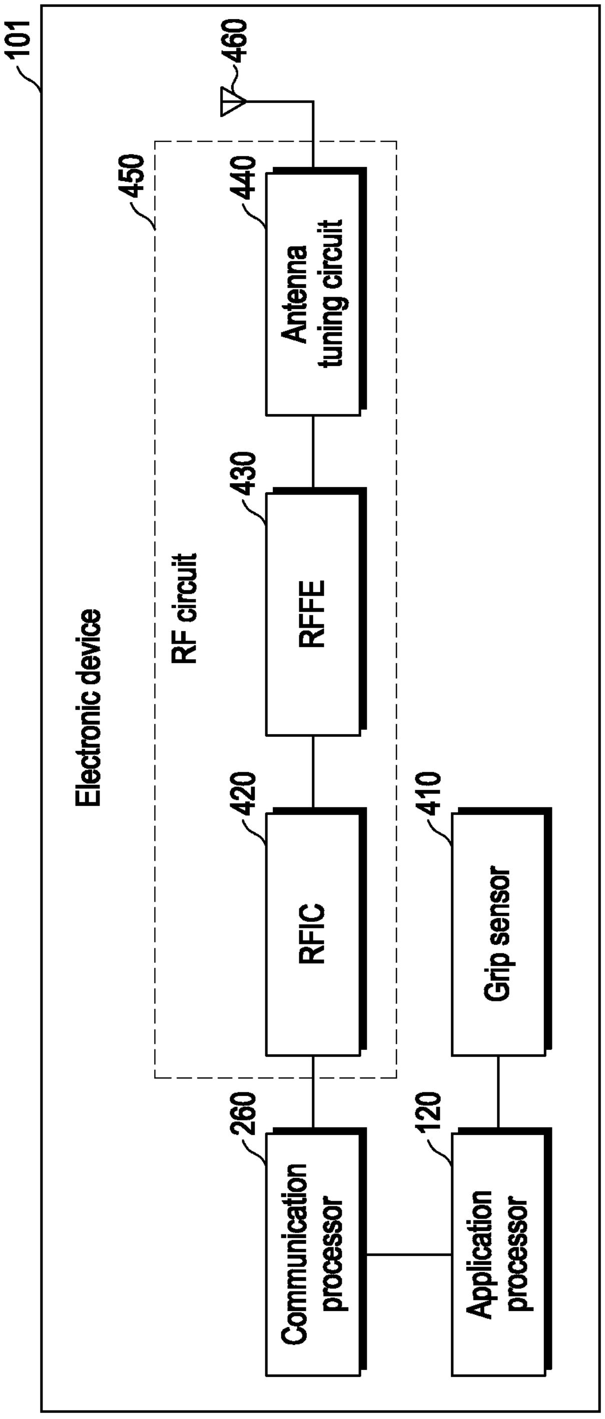
FIG. 4 is a block diagram illustrating an example electronic device according to various embodiments.

FIG. 4 is a block diagram illustrating an example electronic device according to various embodiments.

Referring to FIG. 4, an electronic device 101 (e.g., an electronic device 101 in FIGS. 1, 2A, 2B, and 3A to 3C) may include an application processor 120 (e.g., a processor 120 in FIG. 1, 2A, or 2B), a communication processor 260 (e.g., a processor 120 in FIG. 1, a first communication processor 212 or a second communication processor 214 in FIG. 2A, or an integrated communication processor 260 in FIG. 2B), a grip sensor 410 (e.g., a sensor module 176 in FIG. 1), an RFIC 420 (e.g., a first RFIC 222, a second RFIC 224, a third RFIC 226, or a fourth RFIC 228 in FIG. 2A, or a first RFIC 222, a second RFIC 224, a third RFIC 226, or a fourth RFIC 228 in FIG. 2B), an RFFE 430 (e.g., a first RFFE 232, a second RFFE 234, and a third RFFE 236 in FIG. 2A, or a first RFFE, 232, a second RFFE 234, and a third RFFE 236 in FIG. 2B), an antenna tuning circuit 440, and an antenna 460. In an embodiment, an RF circuit 450 may include an RFIC 420 and an RFFE 430. In FIG. 4, a case in which the electronic device 101 includes one antenna (e.g., the antenna 460) will be described as an example, but the electronic device 101 may include one or more antennas.

According to an embodiment, the grip sensor 410 may recognize approach of or proximity of a dielectric such as a human body. The grip sensor 410 may perform a sensing operation and transfer grip sensor status (grip status) information indicating a sensing result to the application processor 120. The grip sensor status information may indicate "grip touch status" indicating grip status or "grip release status" indicating free space status.

The application processor 120 may receive grip sensor status information from the grip sensor 410, and generate grip status information based on the received grip sensor status information. The grip status information may indicate a "grip touch status" or a "grip release status". The application processor 120 may transfer the generated grip status information to the communication processor 260.

The communication processor 260 may control an operation of the RF circuit 450. In an embodiment, the communication processor 260 may control a setting value (e.g., a tuning value) of the antenna tuning circuit 440, and the antenna tuning circuit 440 may perform an antenna tuning operation based on a setting value set by the communication processor 260.

According to an embodiment, in a grip status due to approach of or proximity of a dielectric, antenna efficiency per frequency of the electronic device 101 may change, so antenna efficiency at a target frequency may also change. A change in the antenna efficiency per frequency due to the approach of or proximity of the dielectric is a characteristic of the electronic device 101, so the communication processor 260 may identify the change in the antenna efficiency per frequency due to the approach of or proximity of the dielectric in advance. For example, the communication processor 260 may identify the change in the antenna efficiency per frequency due to the approach of or proximity of the dielectric in a laboratory environment in advance. So, the communication processor 260 may store a setting value to be used by the antenna tuning circuit 440 in grip status and a setting value to be used by the antenna tuning circuit 440 in free space status in advance, based on the change in the antenna efficiency per frequency due to the approach of or proximity of the dielectric. In an embodiment, the communication processor 260 may store setting values to be used by the antenna tuning circuit 440 in advance in a form of a table including a setting value to be used by the antenna tuning circuit 440 in grip status and a setting value to be used by the antenna tuning circuit 440 in free space status per frequency.

According to an embodiment, when transiting to a radio resource control (RRC) idle (RRC_IDLE) state or an RRC inactive (RRC_INACTIVE) state, the communication processor 260 may turn off the grip sensor 410. According to an embodiment, when transiting to an RRC connected (RRC_CONNECTED) state, the communication processor 260 may turn on the grip sensor 410. The communication processor 260 may control (or set) a setting value of the antenna tuning circuit 440 based on an RRC state.

Figure 5:
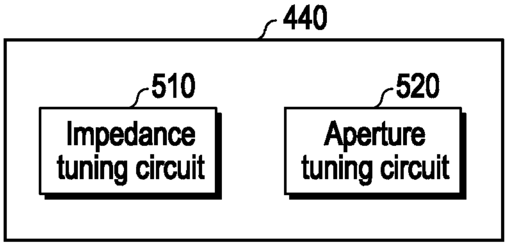
FIG. 5 is a block diagram illustrating an example antenna tuning circuit according to various embodiments.

FIG. 5 is a block diagram illustrating an example antenna tuning circuit according to various embodiments.

Referring to FIG. 5, an antenna tuning circuit 440 (e.g., an antenna tuning circuit 440 in FIG. 4) may include at least one impedance tuning circuit 510 and/or at least one aperture tuning circuit 520.

The impedance tuning circuit 510 may be configured to perform impedance matching with a network under the control of at least one communication processor (e.g., a processor 120 in FIG. 1, a first communication processor 212 or a second communication processor 214 in FIG. 2A, or an integrated communication processor 260 in FIG. 2B).

The aperture tuning circuit may change a structure of an antenna (e.g., an antenna 460 in FIG. 4) by turning on/off a switch under the control of the at least one communication processor.

According to an example embodiment of the disclosure, an electronic device (e.g., an electronic device 101 in FIG. 1, 2A, 2B, 3A to 3C, or 4) may include at least one sensor (e.g., a sensor module 176 in FIG. 1) including a grip sensor (e.g., a grip sensor 410 in FIG. 4), at least one antenna (e.g., an antenna 460), a radio frequency (RF) circuit (e.g., an RF circuit 450 in FIG. 4) including at least one antenna tuning circuit (e.g., an antenna tuning circuit 440 in FIG. 4) connected to the at least one antenna (e.g., the antenna 460), and at least one communication processor (e.g., a processor 120 in FIG. 1, a first communication processor 212 or a second communication processor 214 in FIG. 2A, or an integrated communication processor 260 in FIG. 2B or 4) operatively connected to the RF circuit.

According to an example embodiment of the disclosure, the at least one communication processor (e.g., the processor 120 in FIG. 1, the first communication processor 212 or the second communication processor 214 in FIG. 2A, or the integrated communication processor 260 in FIG. 2B or 4) may be configured to: transit to a radio resource control (RRC) idle (RRC_IDLE) state or an RRC inactive (RRC_INACTIVE) state, and maintain a first tuning value which is a tuning value of the at least one antenna tuning circuit (e.g., the antenna tuning circuit 440 in FIG. 4) which corresponds to the grip sensor (e.g., the grip sensor 410 in FIG. 4) before transition to the RRC_IDLE state or the RRC_INACTIVE.

According to an example embodiment of the disclosure, the at least one communication processor (e.g., the processor 120 in FIG. 1, the first communication processor 212 or the second communication processor 214 in FIG. 2A, or the integrated communication processor 260 in FIG. 2B or 4) may be further configured to control the RF circuit (e.g., the RF circuit 450 in FIG. 4) to transmit a random access preamble signal based on first transmission power and the first tuning value.

According to an example embodiment of the disclosure, the at least one communication processor (e.g., the processor 120 in FIG. 1, the first communication processor 212 or the second communication processor 214 in FIG. 2A, or the integrated communication processor 260 in FIG. 2B or 4) may be further configured to identify whether a random access response (RAR) signal is received via the RF circuit (e.g., the RF circuit 450 in FIG. 4) in response to the random access preamble signal.

According to an example embodiment of the disclosure, the at least one communication processor (e.g., the processor 120 in FIG. 1, the first communication processor 212 or the second communication processor 214 in FIG. 2A, or the integrated communication processor 260 in FIG. 2B or 4) may be further configured to identify whether a set condition is satisfied, based on the RAR signal not being received.

According to an example embodiment of the disclosure, the at least one communication processor (e.g., the processor 120 in FIG. 1, the first communication processor 212 or the second communication processor 214 in FIG. 2A, or the integrated communication processor 260 in FIG. 2B or 4) may be further configured to change the tuning value from the first tuning value to a second tuning value, based on the set condition being satisfied.

According to an example embodiment of the disclosure, the at least one communication processor (e.g., the processor 120 in FIG. 1, the first communication processor 212 or the second communication processor 214 in FIG. 2A, or the integrated communication processor 260 in FIG. 2B or 4) may be further configured to control the RF circuit (e.g., the RF circuit 450 in FIG. 4) to transmit the random access preamble signal based on the first transmission power and the second tuning value.

According to an example embodiment of the disclosure, the set condition may include a condition that the first transmission power is equal to threshold transmission power.

According to an example embodiment of the disclosure, the threshold transmission power may include maximum transmission power (Max Tx power) usable for transmitting the random access preamble signal.

According to an example embodiment of the disclosure, the at least one communication processor is configured to: control the RF circuit to transmit the random access preamble signal a set number of times until the RAR signal is received.

According to an example embodiment of the disclosure, the at least one communication processor (e.g., the processor 120 in FIG. 1, the first communication processor 212 or the second communication processor 214 in FIG. 2A, or the integrated communication processor 260 in FIG. 2B or 4) may be further configured to turn off the grip sensor (e.g., the grip sensor 410 in FIG. 4) after transiting to the RRC_IDLE state or the RRC_INACTIVE state.

According to an example embodiment of the disclosure, the second tuning value may correspond to a second status different from a first status of the grip sensor which corresponds to the first tuning value.

According to an example embodiment of the disclosure, the first status of the grip sensor (e.g., the grip sensor 410 in FIG. 4) may include one of grip touch or grip release.

According to an example embodiment of the disclosure, the at least one communication processor is configured to: control the RF circuit to transmit the random access preamble signal a set number of times until the RAR signal is received.

According to an example embodiment of the disclosure, an electronic device (e.g., an electronic device 101 in FIG. 1, 2A, 2B, 3A to 3C, or 4) may include at least one sensor (e.g., a sensor module 176 in FIG. 1) including a grip sensor (e.g., a grip sensor 410 in FIG. 4), at least one antenna (e.g., an antenna 460), a radio frequency (RF) circuit (e.g., an RF circuit 450 in FIG. 4) including at least one antenna tuning circuit (e.g., an antenna tuning circuit 440 in FIG. 4) connected to the at least one antenna (e.g., the antenna 460), and at least one communication processor (e.g., a processor 120 in FIG. 1, a first communication processor 212 or a second communication processor 214 in FIG. 2A, or an integrated communication processor 260 in FIG. 2B or 4) operatively connected to the RF circuit (e.g., the RF circuit 450 in FIG. 4).

According to an example embodiment of the disclosure, the at least one communication processor (e.g., the processor 120 in FIG. 1, the first communication processor 212 or the second communication processor 214 in FIG. 2A, or the integrated communication processor 260 in FIG. 2B or 4) may be configured to control the RF circuit (e.g., the RF circuit 450 in FIG. 4) to transmit a random access preamble signal based on first transmission power and a first tuning value.

According to an example embodiment of the disclosure, the at least one communication processor (e.g., the processor 120 in FIG. 1, the first communication processor 212 or the second communication processor 214 in FIG. 2A, or the integrated communication processor 260 in FIG. 2B or 4) may be further configured to identify whether a random access response (RAR) signal is received via the RF circuit (e.g., the RF circuit 450 in FIG. 4) in response to the random access preamble signal.

According to an example embodiment of the disclosure, the at least one communication processor (e.g., the processor 120 in FIG. 1, the first communication processor 212 or the second communication processor 214 in FIG. 2A, or the integrated communication processor 260 in FIG. 2B or 4) may be further configured to identify whether a set condition is satisfied, based on the RAR signal not being received.

According to an example embodiment of the disclosure, the at least one communication processor (e.g., the processor 120 in FIG. 1, the first communication processor 212 or the second communication processor 214 in FIG. 2A, or the integrated communication processor 260 in FIG. 2B or 4) may be further configured to change a tuning value of the at least one antenna tuning circuit (e.g., the antenna tuning circuit 440 in FIG. 4) which corresponds to the grip sensor (e.g., the grip sensor 410 in FIG. 4) from the first tuning value to a second tuning value, based on the set condition being satisfied.

According to an example embodiment of the disclosure, the at least one communication processor (e.g., the processor 120 in FIG. 1, the first communication processor 212 or the second communication processor 214 in FIG. 2A, or the integrated communication processor 260 in FIG. 2B or 4) may be further configured to control the RF circuit (e.g., the RF circuit 450 in FIG. 4) to transmit the random access preamble signal based on the first transmission power and the second tuning value.

According to an example embodiment of the disclosure, the set condition may include a condition that the first transmission power is equal to threshold transmission power.

According to an example embodiment of the disclosure, the at least one communication processor is configured to: control the RF circuit to transmit the random access preamble signal a set number of times until the RAR signal is received.

According to an example embodiment of the disclosure, the second tuning value corresponds to a second status different from a first status of the grip sensor (e.g., the grip sensor 410 in FIG. 4) which corresponds to the first tuning value.

According to an example embodiment of the disclosure, the first status of the grip sensor (e.g., the grip sensor 410 in FIG. 4) may include one of grip touch or grip release.

According to an example embodiment of the disclosure, the at least one communication processor is configured to: control the RF circuit to transmit the random access preamble signal a set number of times until the RAR signal is received.

Figure 6:
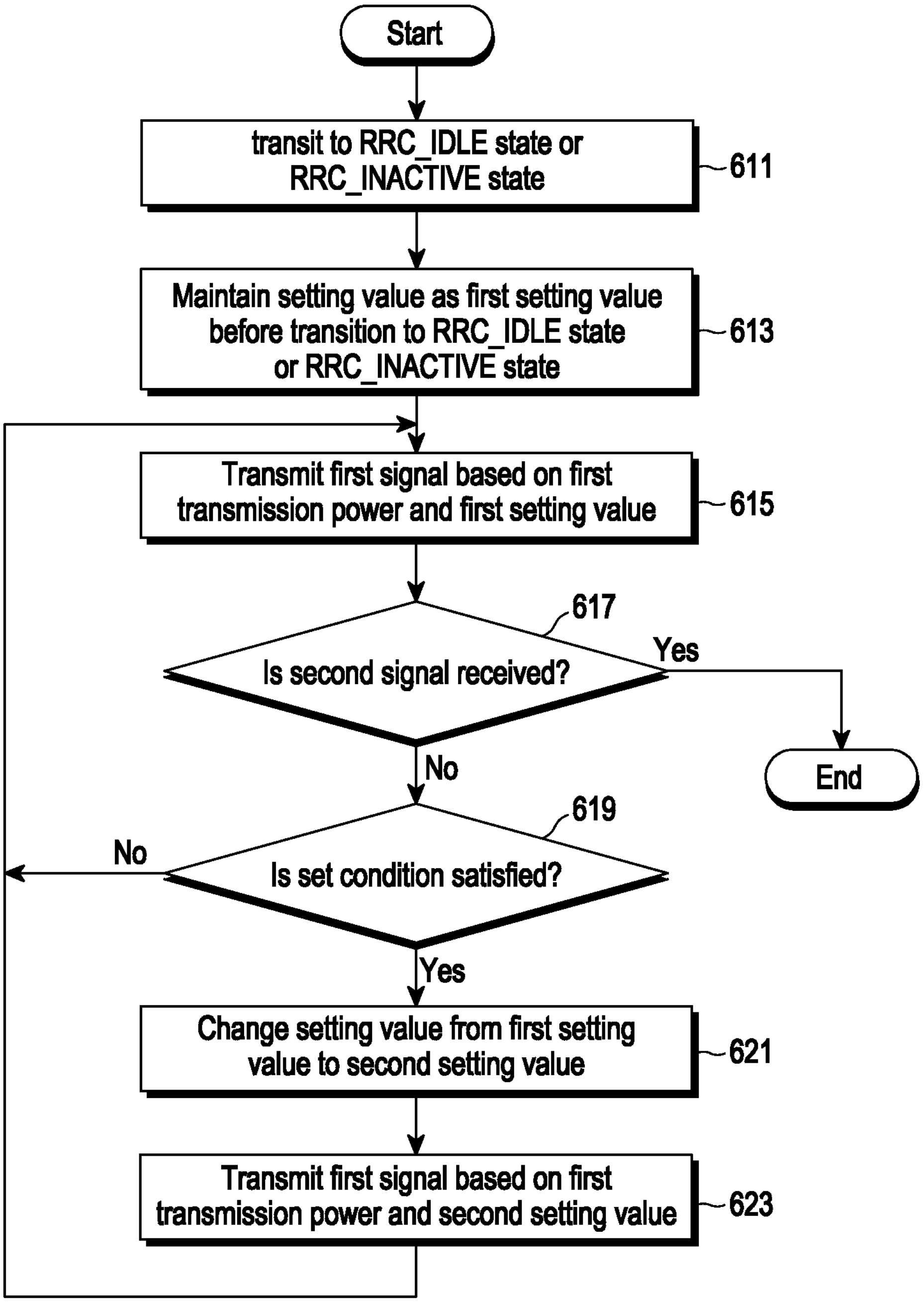
FIG. 6 is a flow chart illustrating an example operating method of an example electronic device according to various embodiments.

FIG. 6 is a flowchart illustrating an example operating method of an example electronic device according to various embodiments.

Referring to FIG. 6, an electronic device (e.g., an electronic device 101 in FIG. 1, 2A, 2B, 3A to 3C, or 4) (e.g., a processor 120 in FIG. 1, a first communication processor 212 or a second communication processor 214 in FIG. 2A, or an integrated communication processor 260 in FIG. 2B or 4) may transit to an RRC_IDLE state or an RRC_INACTIVE state in operation 611. In an embodiment, when transiting to the RRC_IDLE state or the RRC_INACTIVE state, the electronic device may turn off a grip sensor (e.g., a grip sensor 410 in FIG. 4).

After transiting to the RRC_IDLE state or the RRC_INACTIVE state, the electronic device may, in operation 613, maintain a first setting value which is a setting value of at least one antenna tuning circuit (e.g., an antenna tuning circuit 440 in FIG. 4 or 5) which corresponds to a grip sensor (e.g., a grip sensor 410 in FIG. 4) before transition to the RRC_IDLE state or the RRC_INACTIVE state. If grip status information before transition to the RRC_IDLE state or the RRC_INACTIVE state indicates grip touch status, the first setting value may be a setting value used by the at least one antenna tuning circuit in grip status for a frequency used in an RF circuit (e.g., an RF circuit 450 in FIG. 5) including the at least one antenna tuning circuit connected to at least one antenna (e.g., an antenna 460 in FIG. 4). If the grip status information before transition to the RRC_IDLE state or the RRC_INACTIVE state indicates grip release status, the first setting value may be a setting value used by the at least one antenna tuning circuit in free space status for the frequency used in the RF circuit.

In operation 615, the electronic device may transmit a first signal for a random access to a base station based on first transmission power and the first setting value. In an embodiment, the electronic device may control the RF circuit to transmit the first signal for the random access based on the first transmission power and the first setting value. In an embodiment, the first signal may include a random access preamble signal. In an embodiment, the first signal may include the random access preamble signal and data by first scheduled transmission in a random access procedure. In an embodiment, if the electronic device performs a 4-step random access procedure, the first signal may include the random access preamble signal. In an embodiment, if the electronic device performs a 2-step random access procedure, the first signal may include the random access preamble signal and the data by the first scheduled transmission. In an embodiment, the electronic device may transmit the first signal a set number of times (e.g., the number of times indicated by a parameter preambleTransMax) until a second signal is received. In an embodiment, the parameter preambleTransMax may indicate a maximum number of times for transmission of the first signal performed before failure of the random access procedure is declared. So, operation 615 may be performed only until the maximum number of times for transmission of the first signal is reached. In an embodiment, the second signal may be a response signal to the first signal. In an embodiment, the second signal may include a random access response (RAR) signal. In an embodiment, the second signal may include the RAR signal and contention resolution. In an embodiment, if the electronic device performs the 4-step random access procedure, the second signal may include the RAR signal. In an embodiment, if the electronic device performs the 2-step random access procedure, the second signal may include the RAR signal and the contention resolution.

In operation 617, the electronic device may identify whether the second signal is received from the base station in response to the first signal. In an embodiment, the electronic device may identify whether the second signal is received in response to the first signal via the RF circuit. In an embodiment, the electronic device may identify whether the second signal is received in response to the first signal via the RF circuit within a set time period (e.g., a time period indicated by a parameter ra-ResponseWindow). In an embodiment, the parameter ra-ResponseWindow may, for example, indicate a Msg2 (RAR) window length indicated by a network, and the Msg2 (RAR) window length may be, for example, a time period which corresponds to a set number of slots.

As a result of identifying in operation 617, if the second signal is not received, the electronic device may identify whether a set condition is satisfied in operation 619. In an embodiment, the set condition may, for example, include a condition in which the first transmission power is equal to threshold transmission power. The threshold transmission power may include maximum transmission power (Max Tx power) which the electronic device may use to transmit the first signal.

As a result of identifying in operation 619, if the set condition is satisfied, the electronic device may change the setting value from the first setting value to a second setting value in operation 621. In an embodiment, the second setting value may be a setting value other than the first setting value among setting values (e.g., the first setting value and the second setting value) settable for a frequency used in the RF circuit. In an embodiment, the second setting value may be a setting value for the frequency used in the RF circuit which is set to correspond to a second status different from the first status of the grip sensor corresponding to the first setting value. In an embodiment, a case in which the second signal is not received in response to the first signal even though the set condition is satisfied (e.g., even though the first signal is transmitted using the threshold transmission power (e.g., the maximum transmission power)) may include a case in which degradation in an antenna radiation performance occurs due to degradation in antenna efficiency. If the antenna efficiency is degraded, the antenna radiation performance may be degraded, and the degradation in the antenna radiation performance may cause degradation in a total radiated power (TRP) performance and/or degradation in a total isotropic sensitivity (TIS) performance Therefore, according to an embodiment, antenna efficiency may be improved by changing the setting value (e.g., a tuning value) used in the antenna tuning circuit from the first setting value to the second setting value. As the antenna efficiency is improved, the antenna radiation performance may be improved, so the TRP performance and/or the TIS performance may also be improved. As the TRP performance is improved, if the electronic device transmits the first signal based on the first transmission power and the second setting value, a probability that the first signal will reach (be received at) a base station may be increased compared to a case in which the electronic device transmits the first signal based on the first transmission power and the first setting value.

In operation 623, the electronic device may transmit the first signal to the base station based on the first transmission power and the second setting value. In an embodiment, the electronic device may control the RF circuit to transmit the first signal based on the first transmission power and the second setting value.

In FIG. 6, the operation of the electronic device has been described by taking an example of the operation when the electronic device in the RRC_IDLE state or the RRC_INACTIVE state performs the random access procedure. An electronic device in an RRC_CONNECTED state may also operate in a form similar to that described in FIG. 6 when performing a random access procedure. The electronic device exists in the RRC_CONNECTED state, so operations 611 and 613 may be omitted. As operations 611 and 613 are omitted, the first setting value in operation 615 may be a setting value of the at least one antenna tuning circuit at a time point at which the first signal is transmitted which is not a setting value of the at least one antenna tuning circuit before transition to the RRC_IDLE state or the RRC_INACTIVE state. So, operations when the electronic device in the RRC_CONNECTED state performs the random access procedure may be similar to or substantially the same as operations 615 to 623.

Figure 7:
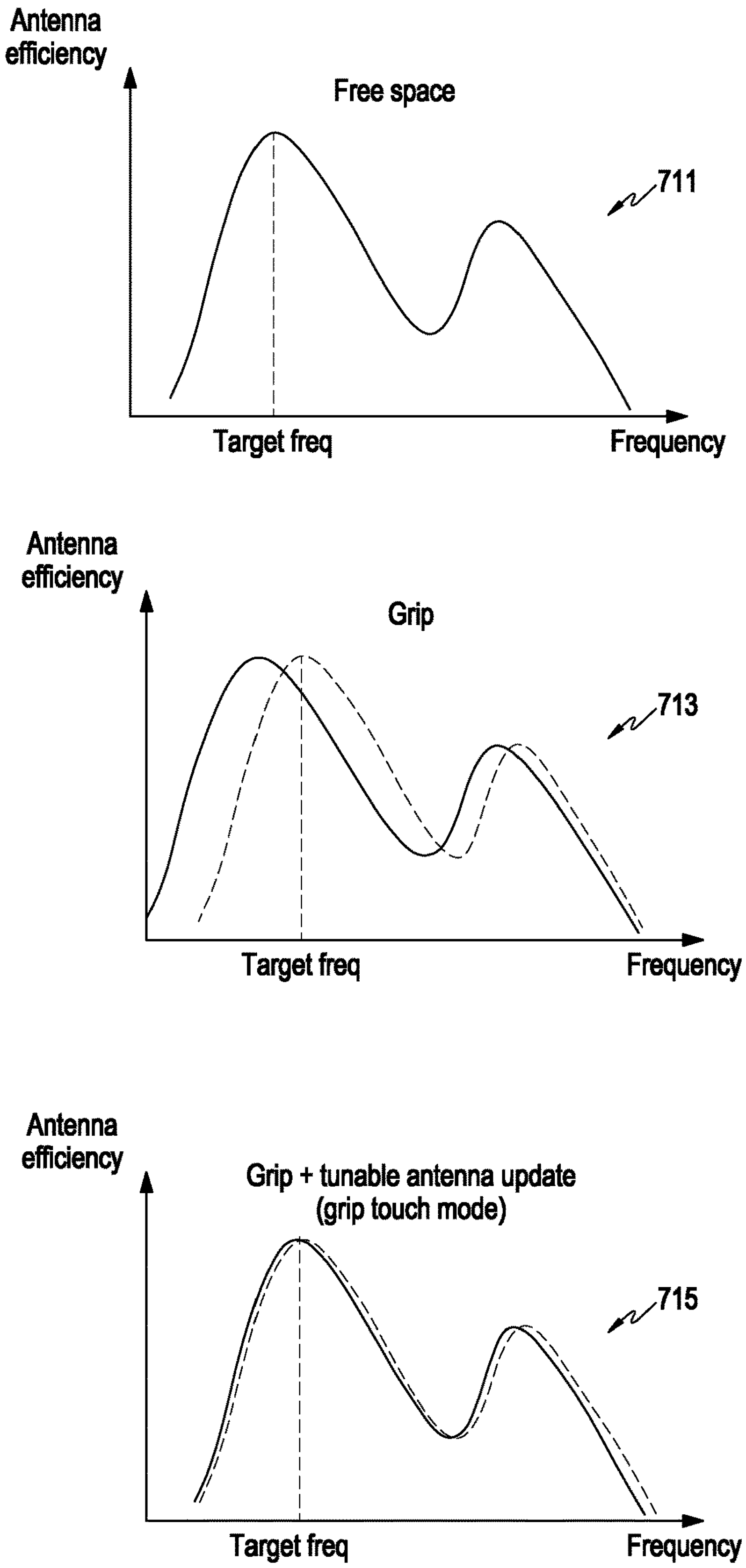
FIG. 7 is a diagram for describing a setting value used for controlling an example antenna tuning circuit according to various embodiments.

FIG. 7 is a diagram for describing a setting value used for controlling an example antenna tuning circuit according to various embodiments.

Referring to FIG. 7, if a dielectric approaches or is in proximity to an antenna (e.g., an antenna 460 in FIG. 4) of an electronic device (e.g., an electronic device 101 in FIG. 1, 2A, 2B, 3A to 3C, or 4), impedance of the antenna may change, accordingly an RF performance may be degraded. Due to degradation in the RF performance, antenna efficiency per frequency may also be degraded. In order to compensate for the degradation in the antenna efficiency, a setting value (e.g., a tuning value) of an antenna tuning circuit (e.g., an antenna tuning circuit 440 in FIG. 4) may be changed.

A reference numeral 711 is a graph showing a change in antenna efficiency in a free space status, a reference numeral 713 is a graph showing a change in antenna efficiency in a grip status, and a reference numeral 715 is a graph showing a change in antenna efficiency based on a tuning value in the grip status (grip+tunable antenna update) (a grip touch mode).

As shown in FIG. 7, in the grip state due to the approach of or proximity of the dielectric, antenna efficiency per frequency of the electronic device may change, so antenna efficiency at a target frequency (Target freq.) may also change.

If the antenna efficiency is degraded, a radiation performance of the antenna may be degraded. The degradation in the radiation performance of the antenna may cause degradation in a total radiated power (TRP) performance and/or degradation in a total isotropic sensitivity (TIS) performance. In an embodiment, the TRP performance may be related to a transmission performance of the electronic device, and the TIS performance may be related to a reception performance of the electronic device.

So, the antenna efficiency may be improved by changing the setting value (e.g., the tuning value) used in the antenna tuning circuit according to a structure of the antenna and the antenna tuning circuit. As the antenna efficiency is improved, the radiation performance of the antenna may be improved, and thus the TRP performance and/or the TIS performance may also be improved.

Because the change in the antenna efficiency per frequency due to the approach of or proximity of the dielectric is a characteristic of the electronic device, the change in the antenna efficiency per frequency due to the approach of the dielectric may be identified, for example, in advance. For example, the electronic device may identify in advance a change in antenna efficiency per frequency due to approach of or proximity of the dielectric in a laboratory environment. So, the electronic device may store in advance a setting value to be used by the antenna tuning circuit in the grip status and a setting value to be used by the antenna tuning circuit in the free space status based on the change in the antenna efficiency per frequency due to the approach of or proximity of the dielectric. In an embodiment, the electronic device may store setting values to be used by the antenna tuning circuit in advance in a form of a table including the setting value to be used by the antenna tuning circuit in the grip status and the setting value to be used by the antenna tuning circuit 440 in the free space status per frequency.

Figure 8:
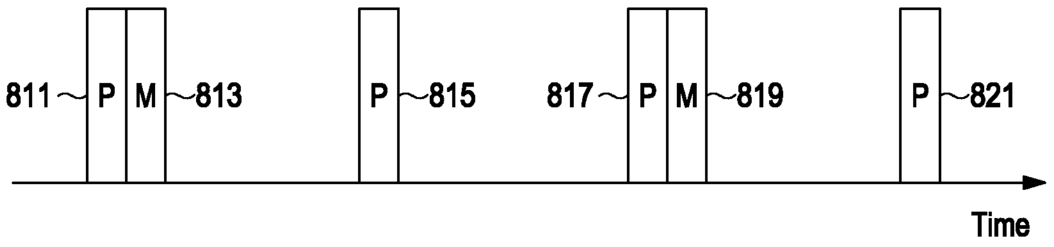
FIG. 8 is a diagram for describing an example operation of an example electronic device which is in a radio resource control (RRC) idle (RRC_IDLE) state or an RRC inactive (RRC_INACTIVE) state according to various embodiments.

FIG. 8 is a diagram for describing an example operation of an example electronic device which is in an RRC_IDLE state or an RRC_INACTIVE state according to various embodiments.

Prior to describing FIG. 8, it may be noted that an operation of an electronic device (e.g., an electronic device 101 in FIG. 1, 2A, 2B, 3A to 3C, or 4) described in FIG. 8 is an operation of the electronic device which is in an RRC_IDLE state or an RRC_INACTIVE state.

Referring to FIG. 8, the electronic device may identify whether a paging signal targeting the electronic device is received from a serving cell based on a set period (e.g., a first period), and perform a measurement operation for the serving cell. The electronic device may perform a measurement operation for a neighbor cell based on a set period (e.g., a second period).

In FIG. 8, time periods 811, 815, 817, and 821 marked with "P" may refer, for example, to a time period during which the electronic device identifies whether a paging signal targeting the electronic device is received from the serving cell, and performs the measurement operation for the serving cell, and time periods 813 and 819 marked with "M" may refer to a time period during which the electronic device performs the measurement operation for the neighboring cell.

The electronic device may maintain a setting value of at least one antenna tuning circuit (e.g., an antenna tuning circuit 440 in FIG. 4 or 5) before transition to the RRC_IDLE state or the RRC_INACTIVE state. If grip status information before transition to the RRC_IDLE state or the RRC_INACTIVE state indicates grip touch status, the setting value may be a setting value used by at least one antenna tuning circuit in grip status for a frequency used in an RF circuit (e.g., an RF circuit 450 in FIG. 5) including the at least one antenna tuning circuit connected to at least one antenna (e.g., an antenna 460 in FIG. 4). If the grip status information before transition to the RRC_IDLE state or the RRC_INACTIVE state indicates grip release status, the setting value may be a setting value used by the at least one antenna tuning circuit in free space status for the frequency used in the RF circuit.

While maintaining the setting value of the at least one antenna tuning circuit before the transition to the RRC_IDLE state or the RRC_INACTIVE state, the electronic device may identify whether the paging signal is received, perform the measurement operation for the serving cell, and perform the measurement operation for the neighbor cell. As such, the measurement operation which the electronic device performs while maintaining the setting value of the at least one antenna tuning circuit before the transition to the RRC_IDLE state or the RRC_INACTIVE state (e.g., at least one of the measurement operation for the serving cell and the measurement operation for the neighbor cell) will be referred to, for example, as a "normal measurement operation".

The electronic device which is in the RRC_IDLE state or RRC_INACTIVE state may determine whether to transit to a sleep state or wake up based on a discontinuous reception (DRX) cycle. The electronic device may identify on-duration based on the DRX cycle, identify whether the paging signal targeting the electronic device is received in an awake state during the on-duration, and perform the measurement operation for the serving cell. In an embodiment, the on-duration may include a duration in which the electronic device waits to receive physical downlink control channels (PDCCHs) after waking up. When the on-duration expires, the electronic device may transit to the sleep state or perform the measurement operation for the neighbor cell based on radio resource management (RRM) configuration. In FIG. 8, the time period marked "P" may correspond to the on-duration.

Figure 9:
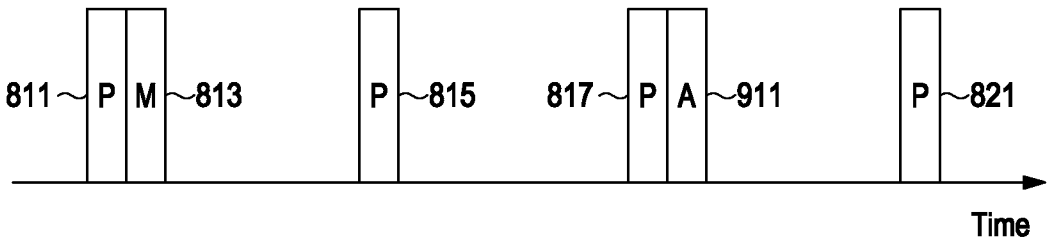
FIG. 9 is a diagram for describing an example operation of an example electronic device which is in an RRC_IDLE state or an RRC_INACTIVE state according to various embodiments.

FIG. 9 is a diagram for describing an example operation of an example electronic device which is in an RRC_IDLE state or an RRC_INACTIVE state according to various embodiments.

Prior to describing FIG. 9, it may be noted that an operation of an electronic device (e.g., an electronic device 101 in FIG. 1, 2A, 2B, 3A to 3C, or 4) described in FIG. 9 is an operation of the electronic device which is in an RRC_IDLE state or an RRC_INACTIVE state.

Referring to FIG. 9, the electronic device may identify whether a paging signal targeting the electronic device is received from a serving cell based on a set period (e.g., a first period), perform a measurement operation for the serving cell, and perform a measurement operation for a neighbor cell based on a set period (e.g., a second period) as described in FIG. 8.

A reason why the electronic device performs the measurement operation for the neighbor cell may be mainly related to a mobility issue such as a handover. So, if the electronic device exists in a stationary environment rather than a mobility environment, the electronic device may skip the measurement operation for the neighbor cell. According to an embodiment, the electronic device may skip the measurement operation for the neighbor cell in a time period in which the measurement operation for the neighbor cell is set to be performed, change a setting value (e.g., a tuning value) of at least one antenna tuning circuit (e.g., an antenna tuning circuit 440 in FIG. 4) which is currently set from a first setting value to a second setting value, and perform the measurement operation for the serving cell based on the second setting value.

In an embodiment, the first setting value may be a setting value which corresponds to grip status information before the electronic device transits to the RRC_IDLE state or the RRC_INACTIVE state. For example, if the grip status information indicates grip touch status, the first setting value may be a setting value used by the at least one antenna tuning circuit in grip status for a frequency used in an RF circuit (e.g., an RF circuit 450 in FIG. 5). If the grip status information before transition to the RRC_IDLE state or the RRC_INACTIVE state indicates grip release status, the first setting value may be a setting value used by the at least one antenna tuning circuit in free space status for the frequency used in the RF circuit.

In an embodiment, the second setting value may be a setting value considering grip status information which is different from (for example, opposite to) the grip status information considered for the first setting value. If the grip status information considered for the first setting value indicates the grip touch status, the second setting value may be a setting value set for a frequency used in the RF circuit if the grip status information indicates grip release status. If the grip status information considered for the first setting value indicates the grip release status, the second setting value may be a setting value set for the frequency used in the RF circuit if the grip status information indicates the grip touch status.

A reason why the measurement operation for the neighbor cell is skipped in the time period in which the measurement operation for the neighbor cell is set to be performed, and the measurement operation for the serving cell is performed based on the second setting value other than the first setting value before transition to the RRC_IDLE state or the RRC_INACTIVE state may be as follows.

The grip sensor consumes current when being turned on, so the electronic device may turn on or turn off the grip sensor according to a state of the electronic device. To prevent current consumption due to the turn-on of the grip sensor, the electronic device may turn off the grip sensor if the state of the electronic device is the RRC_IDLE state or the RRC_INACTIVE state, and may turn on the grip sensor if the state of the electronic device is the RRC_CONNECTED state.

As such, if the state of the electronic device is the RRC_IDLE state or the RRC_INACTIVE state, the grip sensor may be turned off. So, the electronic device may not operate the at least one antenna tuning circuit based on the approach of or proximity of the dielectric sensed by the grip sensor, and as a result, performance degradation in a receiving operation of the electronic device, such as an operation of receiving a paging signal, may occur, and performance degradation in a transmitting operation of the electronic device, such as a case in which the electronic device performs a random access procedure in the RRC_IDLE state, may also occur.

Therefore, in the disclosure, in order to prevent (or in order to mitigate) degradation in a transmission performance and a reception performance due to turn-off of a grip sensor from occurring even though the grip sensor is turned off when a state of an electronic device is transited to an RRC_IDLE state or an RRC_INACTIVE state, the electronic device may skip a measurement operation for a neighbor cell in a time period in which the measurement operation for the neighbor cell is set to be performed and perform a measurement operation for a serving cell based on a second setting value other than a first setting value before transition to the RRC_IDLE state or the RRC_INACTIVE state if a set condition is satisfied (for example, if a stationary condition is satisfied).

As such, the measurement operation (e.g., the measurement operation for the serving cell), which the electronic device performs using the at least one antenna tuning circuit whose setting value is changed to the second setting value after changing the setting value of the at least one antenna tuning circuit from the first setting value to the second setting value if the set condition is satisfied (for example, if the stationary condition is satisfied) in order to prevent (or in order to mitigate) the degradation in the transmission performance and the reception performance due to the turn-off of the grip sensor from occurring even though the grip sensor is turned off when the state of the electronic device is transited to the RRC_IDLE state or the RRC_INACTIVE state, will be referred to, for example, as a "temporary measurement operation".

In FIG. 9, time periods 911, 915, 917, and 921 marked with "P" may represent a time period in which the electronic device identifies whether a paging signal targeting the electronic device is received from the serving cell, and performs the measurement operation for the serving cell, a time period 913 marked with "M" may represent a time period in which the electronic device performs the measurement operation for the neighbor cell, and a time period 919 marked with "A" may represent a time period which is originally set to perform the measurement operation for the neighbor cell, however, in which the electronic device performs the measurement operation (e.g., the temporary measurement operation) for the serving cell based on the second setting value (e.g., the changed tuning value) as the electronic device exists in a stationary environment.

In an embodiment, the temporary measurement operation may be performed based on a set ratio. For example, if the set ratio is 50%, the temporary measurement operation may be performed in one time period corresponding to 50% of time periods in which the measurement operation for the neighbor cell is set to be performed. In an embodiment, the set ratio may be determined based on various parameters suitable for a situation of a wireless communication network.

Figure 10:
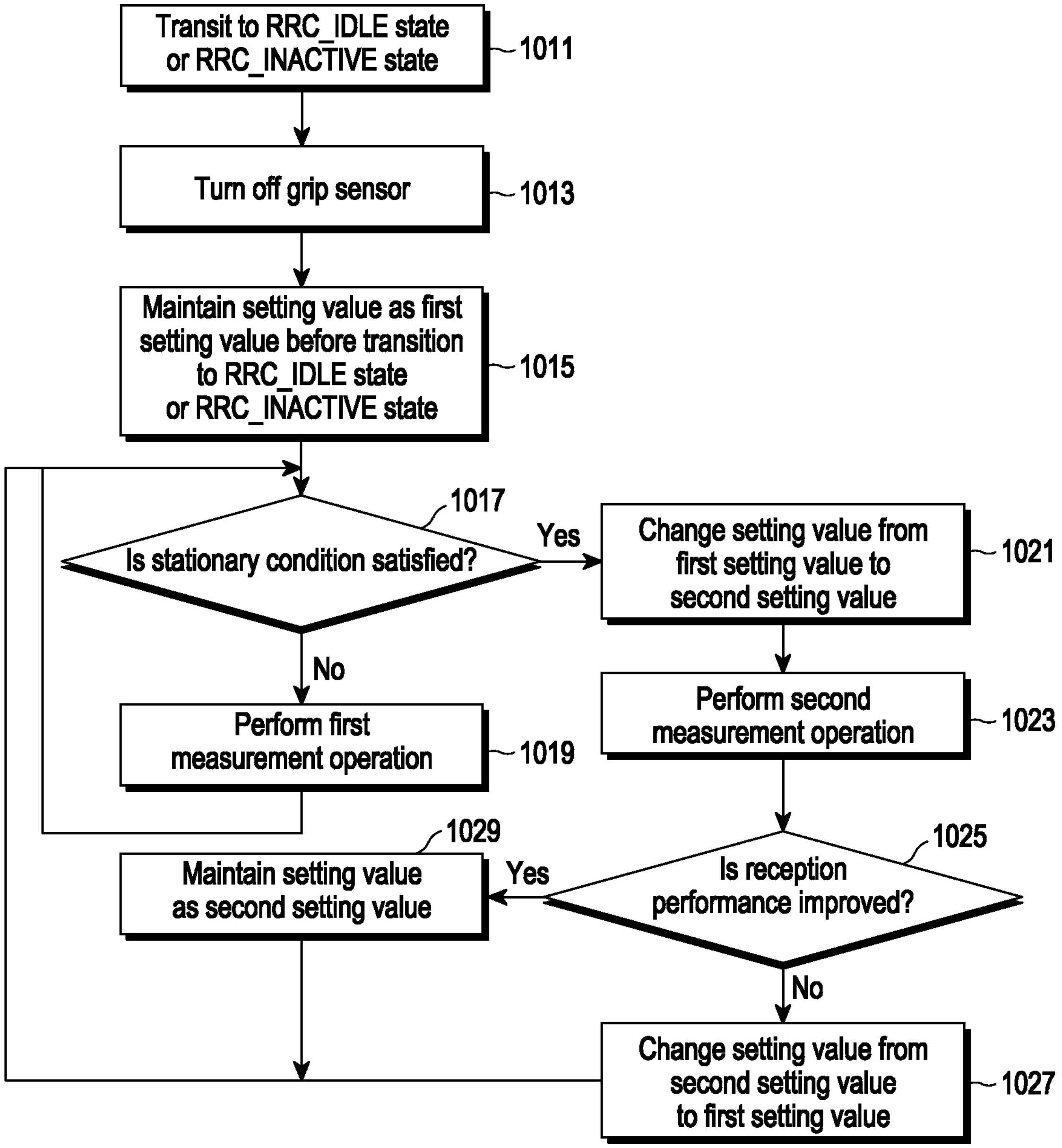
FIG. 10 is a flow chart illustrating an example operating process of an example electronic device according to various embodiments.

FIG. 10 is a flow chart illustrating an example operating process of an example electronic device according to various embodiments Referring to FIG. 10, an electronic device (e.g., an electronic device 101 in FIGS. 1, 2A, 2B, and 3A to 3C) (e.g., a processor 120 in FIG. 1, a first communication processor 212 or a second communication processor 214 in FIG. 2A, an integrated communication processor 260 in FIG. 2B, or a communication processor 260 in FIG. 4) may transit to an RRC_IDLE state in operation 1011.

After transiting to the RRC_IDLE state or an RRC_INACTIVE state, the electronic device may turn off a grip sensor (e.g., a grip sensor 410 in FIG. 4) in operation 1013.

In operation 1015, the electronic device may maintain a first setting value which is a setting value of at least one antenna tuning circuit (e.g., an antenna tuning circuit 440 in FIG. 4 or 5) before transition to the RRC_IDLE state or the RRC_INACTIVE state. If grip status information before the transition to the RRC_IDLE state or the RRC_INACTIVE state indicates grip touch status, the first setting value may be a setting value used by at least one antenna tuning circuit in grip status for a frequency used in an RF circuit (e.g., an RF circuit 450 in FIG. 5) including the at least one antenna tuning circuit connected to at least one antenna (e.g., an antenna 460 in FIG. 4). If the grip status information before the transition to the RRC_IDLE state or the RRC_INACTIVE state indicates grip release status, the first setting value may be a setting value used by the at least one antenna tuning circuit in free space status for the frequency used in the RF circuit. Operation 1015 may be implemented similarly to or substantially the same as operation 613 in FIG. 6, so a detailed description thereof will not be repeated here.

In operation 1017, the electronic device may identify whether a stationary condition is satisfied. In an embodiment, the stationary condition may, for example, include a condition in which the electronic device may be identified as being in stationary state.

In an embodiment, the electronic device may identify whether the electronic device is in the stationary state via a sensor hub (e.g., a sensor module 176 in FIG. 1).

In an embodiment, the electronic device may identify whether the electronic device is in the stationary state based on at least one of an acceleration signal or an angular velocity signal obtained via the sensor hub. In an embodiment, if a change amount of the at least one of the acceleration signal or the angular velocity signal is less than a threshold change amount, the electronic device may identify that the electronic device is in the stationary state. In an embodiment, a case of identifying whether the electronic device is in the stationary state based on the at least one of the acceleration signal or the angular velocity signal is described as an example, however, whether the electronic device is in the stationary state may be identified based on signals sensed in a plurality of sensors included in the sensor hub.

In an embodiment, the electronic device may identify whether the electronic device is in the stationary state based on a cell identifier (ID) of a serving cell and signal strength of the serving cell. In an embodiment, the electronic device may identify that the electronic device is in the stationary state if a difference between signal strength of the serving cell measured in an RRC_CONNECTED state immediately before transition to the RRC_IDLE state or the RRC_INACTIVE state without a cell identifier (ID) of the serving cell being changed and signal strength of the served cell measured in the RRC_IDLE state or the RRC_INACTIVE state is less than a threshold value (e.g., 10 dB). In an embodiment, signal strength may include at least one of reference signal received power (RSRP), a received strength signal indicator (RSSI), reference signal received quality (RSRP), received signal code power (RSCP), a signal to noise ratio (SNR), or a signal to interference plus noise ratio (SINR).

As a result of identifying in operation 1017, if the stationary condition is not satisfied, the electronic device may perform a first measurement operation (e.g., a normal measurement operation) in operation 1019. The normal measurement operation may be implemented similarly to or substantially the same as that described in FIG. 8, so a detailed description thereof will not be repeated here.

As a result of identifying in operation 1017, if the stationary condition is satisfied, the electronic device may change the setting value of the at least one antenna tuning circuit from the first setting value to a second setting value in operation 1021. In an embodiment, the second setting value may be a setting value considering grip status information which is different from (for example, opposite to) the grip status information considered for the first setting value. If the grip status information considered for the first setting value indicates, for example, the grip touch status, the second setting value may be a setting value set for a frequency used in the RF circuit if the grip status information indicates grip release status. If the grip status information considered for the first setting value indicates, for example, the grip release status, the second setting value may be a setting value set for the frequency used in the RF circuit if the grip status information indicates the grip touch status.

In operation 1023, the electronic device may perform a second measurement operation (e.g., a temporary measurement operation) based on the second setting value. The temporary measurement operation may be implemented similarly to or substantially the same as that described in FIG. 9, so a detailed description thereof will not be repeated here.

In operation 1025, the electronic device may identify whether a reception performance is improved. In an embodiment, the electronic device may identify whether the reception performance is improved based on whether signal strength of the serving cell measured through the temporary measurement operation is stronger than signal strength of the serving cell measured through the normal measurement operation by threshold signal strength or more. For example, the electronic device may identify that the reception performance is improved if the signal strength of the serving cell measured through the temporary measurement operation is stronger than the signal strength of the serving cell measured through the normal measurement operation by the threshold signal strength or more. In FIG. 10, a case in which the electronic device identifies whether the reception performance is improved via the temporary measurement operation has been described as an example, however, the electronic device may identify whether reception imbalance is improved through the temporary measurement operation. In an embodiment, the electronic device may identify whether the reception imbalance is improved based on whether a difference between the signal strength of the serving cell measured through the temporary measurement operation and the signal strength of the serving cell measured through the normal measurement operation decreases by a threshold value or more. For example, if a difference between RSRP of the serving cell measured through the temporary measurement operation and RSRP of the serving cell measured through the normal measurement operation decreases by a threshold value (e.g., 2 dB) or more, it may be identified that the reception imbalance is improved.

In an embodiment, a case in which the electronic device includes one grip sensor (e.g., the grip sensor 410 in FIG. 4) has been described as an example, however, the electronic device may include two or more grip sensors. For example, if the electronic device includes two grip sensors, one of the two grip sensors may be used as a main grip sensor and the other grip sensor may be used as a sub grip sensor. For example, the main grip sensor may be a grip sensor disposed on a lower side of the electronic device, and the sub grip sensor may be a grip sensor disposed on an upper side of the electronic device. In a case in which the electronic device includes the two grip sensors, similarly to a case in which the electronic device includes the one grip sensor, the electronic device may perform a measurement operation while controlling a sensor value of at least one antenna tuning circuit corresponding to each grip sensor to the first setting value or the second setting value.

Table 1 below shows signal strength (e.g., RSRP) of the serving cell obtained via an antenna corresponding to the main grip sensor and signal strength of the serving cell obtained via an antenna corresponding to the sub grip sensor in a case in which the electronic device includes the two grip sensors.

TABLE 1

| | Signal strength of serving cell (e.g., RSRP (dBm)) | |
|---|---|---|
| | Antenna corresponding to main grip sensor | Antenna corresponding to sub grip sensor |
| First setting value | −80 | −77 |
| Second setting value | −77 | −77 |

In Table 1, it may be seen that a difference between signal strength of the serving cell obtained via the antenna corresponding to the main grip sensor and signal strength of the serving cell obtained via the antenna corresponding to the sub grip sensor in a case in which the first setting value is applied decreases by a threshold value (e.g., 2 dB) or more compared to a difference between signal strength of the serving cell obtained via the antenna corresponding to the main grip sensor and signal strength of the serving cell obtained via the antenna corresponding to the sub grip sensor in a case that the second setting value is applied. For example, as shown in Table 1, a gain of 3 dB occurs in the antenna corresponding to the main grip sensor, so the electronic device may identify that a reception performance is improved. As a result of identifying in operation 1025, if the reception performance is improved, the electronic device may maintain the setting value of the at least one antenna tuning circuit as the second setting value in operation 1029.

As the result of identifying in operation 1025, if the reception performance is not improved, the electronic device may change the setting value of the at least one antenna tuning circuit from the second setting value to the first setting value in operation 1027.

Figure 11:
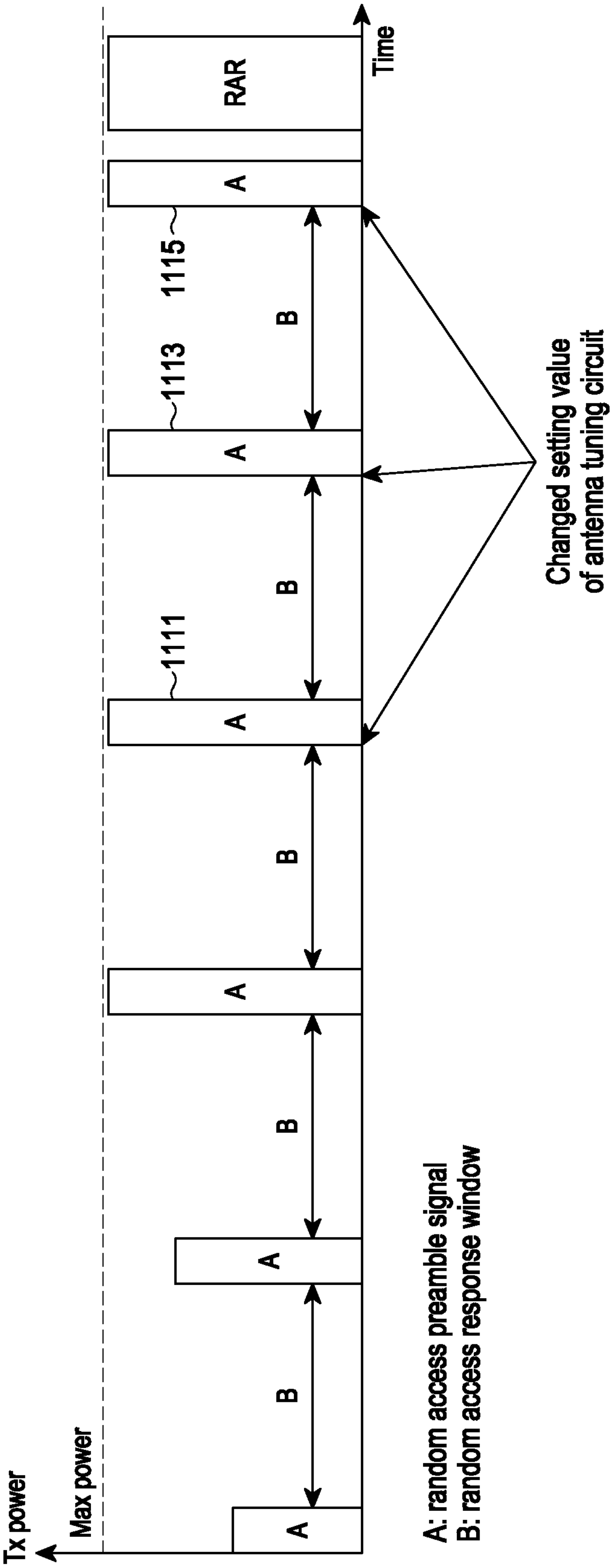
FIG. 11 is a diagram for describing an example operation of an example electronic device which is in an RRC_IDLE state or an RRC_INACTIVE state according to various embodiments.

FIG. 11 is a diagram for describing an example operation of an example electronic device which is in an RRC_IDLE state or an RRC_INACTIVE state according to various embodiments.

Prior to describing FIG. 11, it will be noted that an operation of an electronic device (e.g., an electronic device 101 in FIG. 1, 2A, 2B, 3A to 3C, or 4) described in FIG. 11 may be an operation of performing a random access procedure in the electronic device which is in an RRC_IDLE state or an RRC_INACTIVE state.

Referring to FIG. 11, a vertical axis represents transmission power (Tx power), and a horizontal axis represents time. In FIG. 11, "A" may represent, for example, a random access preamble signal. In FIG. 11, "B" may represent, for example, a random access response window, and the random access response window may represent, for example, a time period indicated by a parameter ra-ResponseWindow. The electronic device may transit to the RRC_IDLE state or the RRC_INACTIVE state. In an embodiment, the electronic device may turn off a grip sensor (e.g., a grip sensor 410 in FIG. 4) when transiting to the RRC_IDLE state or the RRC_INACTIVE state.

After transiting to the RRC_IDLE state or the RRC_INACTIVE state, the electronic device may maintain a first setting value which is a setting value of at least one antenna tuning circuit (e.g., an antenna tuning circuit 440 in FIG. 4 or 5) which corresponds to the grip sensor before transition to the RRC_IDLE state or the RRC_INACTIVE state. If grip status information before transition to the RRC_IDLE state or the RRC_INACTIVE state indicates, for example, grip touch status, the first setting value may be a setting value used by at least one antenna tuning circuit in grip status for a frequency used in an RF circuit (e.g., an RF circuit 450 in FIG. 5) including the at least one antenna tuning circuit connected to at least one antenna (e.g., an antenna 460 in FIG. 4). If the grip status information before transition to the RRC_IDLE state or the RRC_INACTIVE state indicates, for example, grip release status, the first setting value may be a setting value used by the at least one antenna tuning circuit in free space status for the frequency used in the RF circuit.

The electronic device in the RRC_IDLE state or the RRC_INACTIVE state may transmit a first signal for a random access based on first transmission power and the first setting value. In an embodiment, the electronic device may transmit the first signal a set number of times (e.g., the number of times indicated by a parameter preambleTransMax) until a second signal is received. In an embodiment, the parameter preambleTransMax may indicate a maximum number of times for transmission of the first signal performed before failure of the random access procedure is declared.

In an embodiment, the first signal may include a random access preamble signal. In an embodiment, the first signal may include the random access preamble signal and data by first scheduled transmission in a random access procedure. In an embodiment, if the electronic device performs a 4-step random access procedure, the first signal may include the random access preamble signal. In an embodiment, if the electronic device performs a 2-step random access procedure, the first signal may include the random access preamble signal and the data by the first scheduled transmission. In an embodiment, the second signal may be a response signal to the first signal. In an embodiment, the second signal may, for example, include an RAR signal. In an embodiment, the second signal may include the RAR signal and contention resolution. In an embodiment, if the electronic device performs the 4-step random access procedure, the second signal may, for example, include the RAR signal. In an embodiment, if the electronic device performs the 2-step random access procedure, the second signal may, for example, include the RAR signal and the contention resolution.

Even though transmitting the random access preamble signal (marked as "A" in FIG. 11) based on the first transmission power which is maximum transmission power (Max power) and the first setting value, the electronic device may not receive the RAR signal within a set time period (marked as "B" in FIG. 11) (e.g., a time period indicated by a parameter ra-ResponseWindow). In this case, before it reaches the number of times indicated by the parameter preambleTransMax, the electronic device may change the setting value of the at least one antenna tuning circuit from the first setting value to the second setting value, and transmit the random access preamble signal based on the second setting value and the first transmission power until the RAR is received (operations 1111, 1113, and 1115). In FIG. 11, a condition in which the second setting value is applied may include a condition in which the first transmission power is equal to threshold transmission power. The threshold transmission power may be maximum transmission power which the electronic device may use to transmit the first signal.

In an embodiment, the second setting value may be a setting value considering grip status information which is different from (for example, opposite to) the grip status information considered for the first setting value. If the grip status information considered for the first setting value indicates, for example, the grip touch status, the second setting value may be a setting value set for a frequency used in the RF circuit if the grip status information indicates grip release status. If the grip status information considered for the first setting value indicates, for example, the grip release status, the second setting value may be a setting value set for the frequency used in the RF circuit if the grip status information indicates the grip touch status.

In FIG. 11, the operation of the electronic device has been described by taking an example of the operation when the electronic device in the RRC_IDLE state or the RRC_INACTIVE state performs the random access procedure. An electronic device in an RRC_CONNECTED state may also operate in a form similar to that described in FIG. 11 when performing a random access procedure. However, the electronic device exists in the RRC_CONNECTED state, so the first setting value may be a setting value of the at least one antenna tuning circuit at a time point at which the first signal is transmitted which is not a setting value of the at least one antenna tuning circuit before transition to the RRC_IDLE state or the RRC_INACTIVE state.

Figure 12:
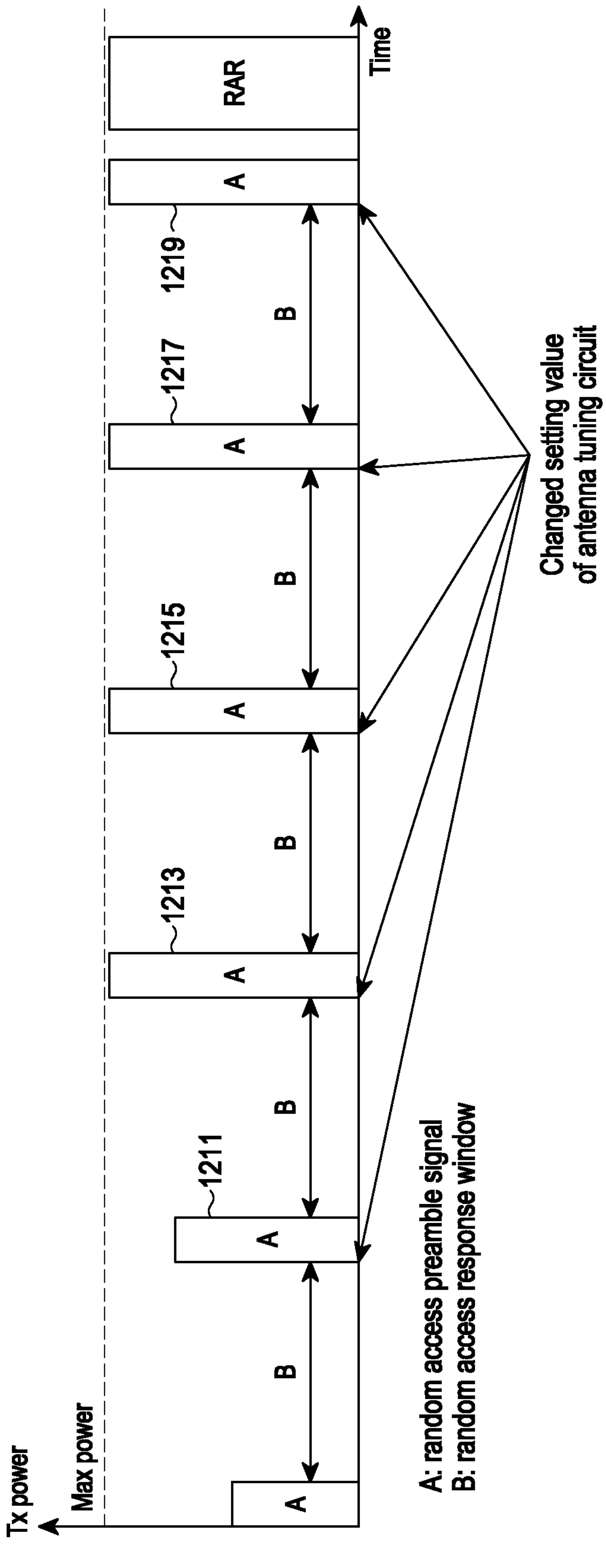
FIG. 12 is a diagram for describing an example operation of an example electronic device which is in an RRC_IDLE state or an RRC_INACTIVE state according to various embodiments.

FIG. 12 is a diagram for describing an example operation of an example electronic device which is in an RRC_IDLE state or an RRC_INACTIVE state according to various embodiments.

Prior to describing FIG. 12, it will be noted that an operation of an electronic device (e.g., an electronic device 101 in FIG. 1, 2A, 2B, 3A to 3C, or 4) described in FIG. 12 may be an operation of performing a random access procedure in the electronic device which is in an RRC_IDLE state or an RRC_INACTIVE state.

Referring to FIG. 12, a vertical axis represents transmission power (Tx power), and a horizontal axis represents time. In FIG. 12, "A" may, for example, represent a random access preamble signal. In FIG. 12, "B" may, for example, represent a random access response window, and the random access response window may, for example, represent a time period indicated by a parameter ra-ResponseWindow. The operation of performing the random access procedure by the electronic device shown in FIG. 12 may be performed similarly to or substantially the same as an operation of performing a random access procedure by an electronic device described in FIG. 11 except for a time point at which a second setting value of at least one antenna tuning circuit is applied. In FIG. 11, a case has been described in which the electronic device changes a setting value of the at least one antenna tuning circuit from a first setting value to the second setting value if the electronic device does not receive an RAR signal within a set time period even though transmitting a random access preamble signal based on first transmission power which is maximum transmission power and the first setting value.

However, in FIG. 12, a case is described in which the electronic device changes the setting value of the at least one antenna tuning circuit from the first setting value to the second setting value even though the electronic device does not receive the RAR signal within the set time period after transmitting the random access preamble signal based on second transmission power less than the first transmission power which is the maximum transmission power and the first setting value (operations 1211, 1213, 1215, 1217, and 1219).

In FIG. 12, a condition in which the second setting value is applied may include a condition in which the first transmission power is less than threshold transmission power. The threshold transmission power may be maximum transmission power which the electronic device may use to transmit the first signal.

In FIG. 12, the operation of the electronic device has been described by taking an example of the operation when the electronic device in the RRC_IDLE state or the RRC_I-

NACTIVE state performs the random access procedure. An electronic device in an RRC_CONNECTED state may also operate in a form similar to that described in FIG. 12 when performing a random access procedure. However, the electronic device exists in the RRC_CONNECTED state, so the first setting value may be a setting value of the at least one antenna tuning circuit at a time point at which the first signal is transmitted which is not a setting value of the at least one antenna tuning circuit before transition to the RRC_IDLE state or the RRC_INACTIVE state.

Figure 13:
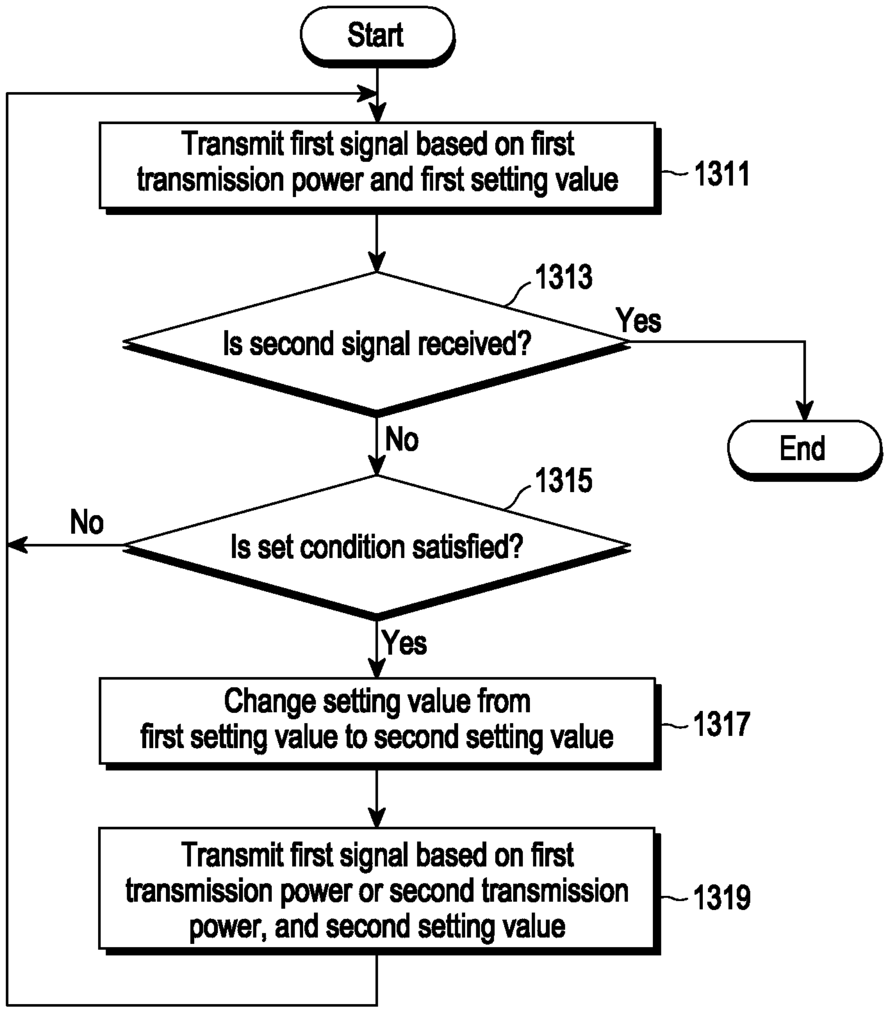
FIG. 13 is a flow chart illustrating an example operating method of an example electronic device according to various embodiments.

FIG. 13 is a flow chart illustrating an example operating method of an example electronic device according to various embodiments.

Referring to FIG. 13, an electronic device (e.g., an electronic device 101 in FIG. 1, 2A, 2B, 3A to 3C, or 4) (e.g., a processor 120 in FIG. 1, a first communication processor 212 or a second communication processor 214 in FIG. 2A, or an integrated communication processor 260 in FIG. 2B or 4) which is in an RRC_CONNECTED state may transmit a first signal for a random access based on a first setting value which is a setting value of at least one antenna tuning circuit (e.g., an antenna tuning circuit 440 in FIG. 4 or 5) which corresponds to a grip sensor (e.g., a grip sensor 410 in FIG. 4) and first transmission power in operation 1311. If grip status information indicates, for example, grip touch status, the first setting value may be a setting value used by the at least one antenna tuning circuit in grip status for a frequency used in an RF circuit (e.g., an RF circuit 450 in FIG. 5) including the at least one antenna tuning circuit connected to at least one antenna (e.g., an antenna 460 in FIG. 4). If the grip status information indicates, for example, grip release status, the first setting value may be a setting value used by the at least one antenna tuning circuit in free space status for the frequency used in the RF circuit.

In operation 1311, the electronic device may transmit a first signal for a random access based on first transmission power and the first setting value. In an embodiment, the electronic device may control the RF circuit to transmit the first signal for the random access based on the first transmission power and the first setting value. In an embodiment, the first signal may include a random access preamble signal. In an embodiment, the first signal may include the random access preamble signal and data by first scheduled transmission in a random access procedure. In an embodiment, if the electronic device performs a 4-step random access procedure, the first signal may include the random access preamble signal. In an embodiment, if the electronic device performs a 2-step random access procedure, the first signal may include the random access preamble signal and the data by the first scheduled transmission. In an embodiment, the electronic device may transmit the first signal a set number of times (e.g., the number of times indicated by a parameter preambleTransMax) until a second signal is received. So, operation 1311 may be performed only until the maximum number of times for transmission of the first signal is reached. In an embodiment, the second signal may, for example, be a response signal to the first signal. In an embodiment, the second signal may include an RAR signal. In an embodiment, the second signal may include the RAR signal and contention resolution. In an embodiment, if the electronic device performs the 4-step random access procedure, the second signal may include the RAR signal. In an embodiment, if the electronic device performs the 2-step random access procedure, the second signal may include the RAR signal and the contention resolution.

In operation 1313, the electronic device may identify whether the second signal is received in response to the first signal. In an embodiment, the electronic device may identify whether the second signal is received in response to the first signal via the RF circuit. In an embodiment, the electronic device may identify whether the second signal is received in response to the first signal via the RF circuit within a set time period (e.g., a time period indicated by a parameter ra-ResponseWindow).

As a result of identifying in operation 1313, if the second signal is not received, the electronic device may identify whether a set condition is satisfied in operation 1315. In an embodiment, the set condition may include a first condition in which the first transmission power is equal to threshold transmission power. The threshold transmission power may be maximum transmission power which the electronic device may use to transmit the first signal. In an embodiment, the set condition may include a second condition in which the first transmission power is less than the threshold transmission power.

As a result of identifying in operation 1315, if the set condition is satisfied, the electronic device may change the setting value from the first setting value to a second setting value in operation 1317. In an embodiment, the second setting value may be a setting value, for example, considering grip status information which is different from (for example, opposite to) the grip status information considered for the first setting value. If the grip status information considered for the first setting value indicates, for example, the grip touch status, the second setting value may be a setting value set for a frequency used in the RF circuit if the grip status information indicates grip release status. If the grip status information considered for the first setting value indicates, for example, the grip release status, the second setting value may be a setting value set for the frequency used in the RF circuit if the grip status information indicates the grip touch status.

In operation 1319, the electronic device may transmit the first signal based on the first transmission power or the second transmission power, and the second setting value. In an embodiment, the electronic device may control the RF circuit to transmit the first signal based on the first transmission power or the second transmission power, and the second setting value. In an embodiment, if the set condition is the first condition, the electronic device may control the RF circuit to transmit the first signal based on the first transmission power and the second setting value. In an embodiment, if the set condition is the second condition, the electronic device may control the RF circuit to transmit the first signal based on the second transmission power and the second setting value.

According to an embodiment of the disclosure, the grip sensor (e.g., the grip sensor 410 in FIG. 4) may sense additional status such as hard grip status and death grip status as well as the grip touch status and the grip release status.

Table 2 below shows grip status which may be sensed by the grip sensor.

TABLE 2

| Grip status | Description |
|---|---|
| Grip release | Free space status |
| Grip touch | General grip status |
| Hard grip | Status in which a user grabs an antenna, and then a change in antenna efficiency is greater than or equal to a first threshold amount |

TABLE 2-continued

| Grip status | Description |
| --- | --- |
| Death grip | Status in which a user grips a specific part of an antenna, and then a change in antenna efficiency is greater than or equal to a second threshold amount |

As shown in Table 2, grip status sensed via the grip sensor may be various, and the setting value for the at least one antenna tuning circuit (e.g., the antenna tuning circuit 440 in FIG. 4 or 5) may be determined by applying all of the grip status sensed via the grip sensor. In this case, a table including setting values to be used by the antenna tuning circuit may include setting values corresponding to the hard grip status and the death grip status as well as the grip touch status and the grip release status.

In an embodiment, in a case in which the setting value to be used by the antenna tuning circuit is determined by considering only the grip touch status and the grip release status, if grip status corresponding to the first setting value is the grip touch status, grip status corresponding to the second setting value may be the grip releasing state.

In an embodiment, in a case in which the setting value to be used by the antenna tuning circuit is determined by considering the grip touch status, the grip release status, the hard grip status, and the death grip status, if grip status corresponding to the first setting value is the grip touch status, grip status corresponding to the second setting value may be one of the grip releasing state, the hard grip status, and the death grip status.

Figure 14:
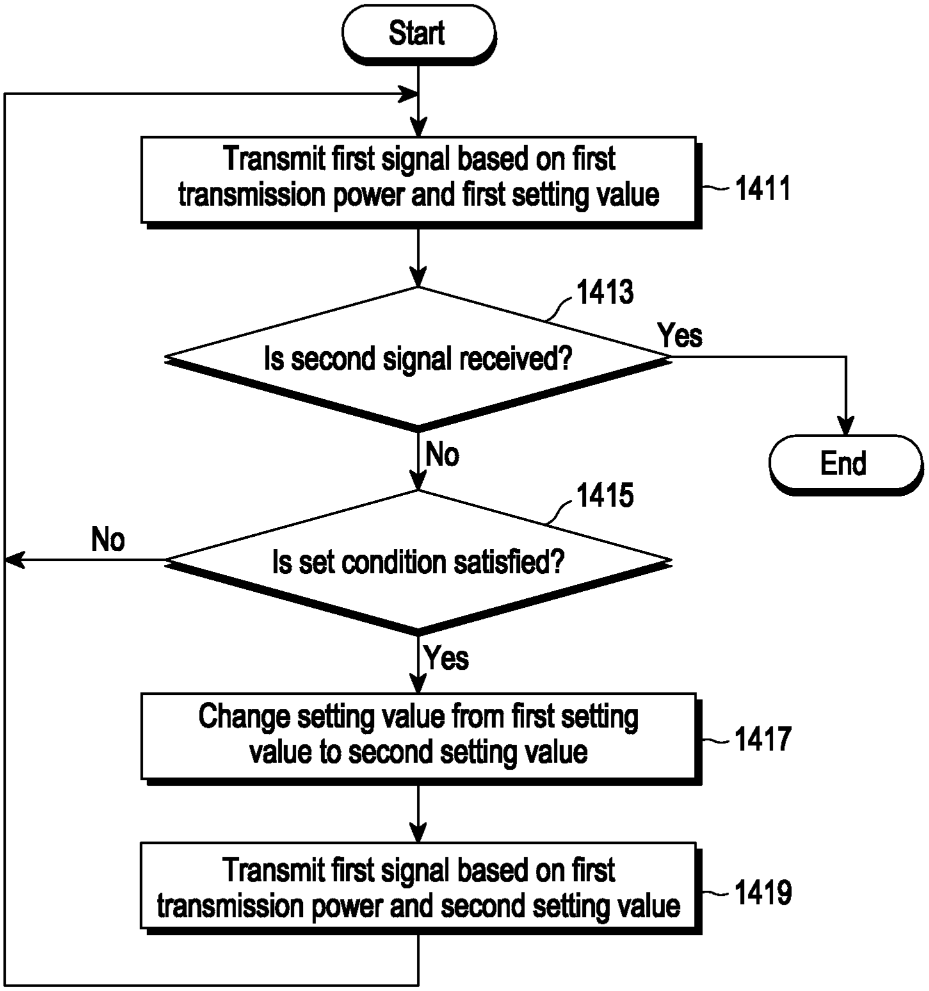
FIG. 14 is a flow chart illustrating an example operating method of an example electronic device according to various embodiments.

FIG. 14 is a flow chart illustrating an example operating method of an example electronic device according to various embodiments.

Referring to FIG. 14, an electronic device (e.g., an electronic device 101 in FIG. 1, 2A, 2B, 3A to 3C, or 4) (e.g., a processor 120 in FIG. 1, a first communication processor 212 or a second communication processor 214 in FIG. 2A, or an integrated communication processor 260 in FIG. 2B or 4) may transmit a first signal for a random access to a base station based on first transmission power and a first setting value in operation 1411. In an embodiment, a setting value may include a tuning value of at least one antenna tuning circuit (e.g., an antenna tuning circuit 440 in FIG. 4 or 5). In an embodiment, the electronic device may control the RF circuit to transmit the first signal for the random access based on the first transmission power and the first setting value. In an embodiment, the first signal may include a random access preamble signal. In an embodiment, the first signal may include the random access preamble signal and data by first scheduled transmission in a random access procedure. In an embodiment, if the electronic device performs a 4-step random access procedure, the first signal may include the random access preamble signal. In an embodiment, if the electronic device performs a 2-step random access procedure, the first signal may include the random access preamble signal and the data by the first scheduled transmission. In an embodiment, the electronic device may transmit the first signal a set number of times (e.g., the number of times indicated by a parameter preambleTransMax) until a second signal is received in response to the first signal. In an embodiment, the parameter preambleTransMax may indicate the maximum number of times for transmission of the first signal performed before failure of the random access procedure is declared. So, operation 1411 may be performed only until the maximum number of times for transmission of the first signal is reached. In an embodiment, the second signal may be a response signal to the first signal. In an embodiment, the second signal may include an RAR signal. In an embodiment, the second signal may include the RAR signal and contention resolution. In an embodiment, if the electronic device performs the 4-step random access procedure, the second signal may include the RAR signal. In an embodiment, if the electronic device performs the 2-step random access procedure, the second signal may include the RAR signal and the contention resolution.

In operation 1413, the electronic device may identify whether the second signal is received from the base station in response to the first signal. In an embodiment, the electronic device may identify whether the second signal is received in response to the first signal via the RF circuit. In an embodiment, the electronic device may identify whether the second signal is received in response to the first signal via the RF circuit within a set time period (e.g., a time period indicated by a parameter ra-ResponseWindow). In an embodiment, the parameter ra-ResponseWindow may indicate a Msg2 (RAR) window length indicated by a network, and the Msg2 (RAR) window length may be, for example, a time period which corresponds to a set number of slots.

As a result of identifying in operation 1413, if the second signal is not received, the electronic device may identify whether a set condition is satisfied in operation 1415. In an embodiment, the set condition may include a first condition in which the first transmission power is equal to threshold transmission power. The threshold transmission power may include maximum transmission power (Max Tx power) which the electronic device may use to transmit the first signal.

As a result of identifying in operation 1415, if the set condition is satisfied, the electronic device may change the setting value from the first setting value to a second setting value in operation 1417. In an embodiment, the second setting value may be a setting value other than the first setting value among setting values (e.g., the first setting value and the second setting value) settable for a frequency used in the RF circuit. In an embodiment, the second setting value may be a setting value for the frequency used in the RF circuit which is set to correspond to a second status different from the first status of the grip sensor corresponding to the first setting value.

In an embodiment, a case in which the second signal is not received in response to the first signal even though the set condition is satisfied (e.g., even though the first signal is transmitted using the threshold transmission power (e.g., the maximum transmission power)) may include a case in which degradation in an antenna radiation performance occurs due to degradation in antenna efficiency. If the antenna efficiency is degraded, the antenna radiation performance may be degraded, and the degradation in the antenna radiation performance may cause degradation in a total radiated power (TRP) performance and/or degradation in a total isotropic sensitivity (TIS) performance Therefore, according to an embodiment, antenna efficiency may be improved by changing the setting value (e.g., a tuning value) used in the antenna tuning circuit from the first setting value to the second setting value. As the antenna efficiency is improved, the antenna radiation performance may be improved, so the TRP performance and/or the TIS performance may also be improved. As the TRP performance is improved, if the electronic device transmits the first signal based on the first transmission power and the second setting value, a probability that the first signal will reach (be received at) a base station may be increased compared to a case in which the electronic device transmits the first signal based on the first transmission power and the first setting value.

In operation 1419, the electronic device may transmit the first signal to the base station based on the first transmission power and the second setting value. In an embodiment, the electronic device may control the RF circuit to transmit the first signal based on the first transmission power and the second setting value.

According to an example embodiment of the disclosure, an operating method of an electronic device (e.g., an electronic device 101 in FIG. 1, 2A, 2B, 3A to 3C, or 4) may include transiting to a radio resource control (RRC) idle (RRC_IDLE) state or an RRC inactive (RRC_INACTIVE) state, and maintaining a first tuning value which is a tuning value of at least one antenna tuning circuit (e.g., an antenna tuning circuit 440 in FIG. 4) which corresponds to a grip sensor (e.g., a grip sensor 410 in FIG. 4) before transition to the RRC_IDLE state or the RRC_INACTIVE.

According to an example embodiment of the disclosure, the operating method may further include transmitting a random access preamble signal based on first transmission power and the first tuning value.

According to an example embodiment of the disclosure, the operating method may further include identifying whether a random access response (RAR) signal is received in response to the random access preamble signal.

According to an example embodiment of the disclosure, the operating method may further include identifying whether a set condition is satisfied, based on the RAR signal not being received.

According to an example embodiment of the disclosure, the operating method may further include changing the tuning value from the first tuning value to a second tuning value, based on the set condition being satisfied.

According to an example embodiment of the disclosure, the operating method may further include transmitting the random access preamble signal based on the first transmission power and the second tuning value.

According to an example embodiment of the disclosure, the set condition may include a condition that the first transmission power is equal to threshold transmission power.

According to an example embodiment of the disclosure, the threshold transmission power may include maximum transmission power usable for transmitting the random access preamble signal.

According to an example embodiment of the disclosure, the random access preamble signal is capable of being transmitted a set number of times until the RAR signal is received.

According to an example embodiment of the disclosure, the operating method may further include turning off the grip sensor (e.g., the grip sensor 410 in FIG. 4) after transiting to the RRC_IDLE state or the RRC_INACTIVE state.

According to an example embodiment of the disclosure, the second tuning value may correspond to a second status different from a first status of the grip sensor (e.g., the grip sensor 410 in FIG. 4) which corresponds to the first tuning value.

According to an example embodiment of the disclosure, the first status of the grip sensor (e.g., the grip sensor 410 in FIG. 4) may include one of grip touch or grip release.

According to an example embodiment of the disclosure, the random access preamble signal is capable of being transmitted a set number of times until the RAR signal is received.

According to an example embodiment of the disclosure, an operating method of an electronic device (e.g., an electronic device 101 in FIG. 1, 2A, 2B, 3A to 3C, or 4) may include transmitting a random access preamble signal based on first transmission power and a first tuning value.

According to an example embodiment of the disclosure, the operating method may further include identifying whether a random access response (RAR) signal is received via the RF circuit in response to the random access preamble signal.

According to an example embodiment of the disclosure, the operating method may further include identifying whether a set condition is satisfied, based on the RAR signal not being received.

According to an example embodiment of the disclosure, the operating method may further include changing a tuning value of at least one antenna tuning circuit 440 which corresponds to a grip sensor 410 from the first tuning value to a second tuning value, based on the set condition being satisfied.

According to an example embodiment of the disclosure, the operating method may further include transmitting the random access preamble signal based on the first transmission power and the second tuning value.

According to an example embodiment of the disclosure, the set condition may include a condition that the first transmission power is equal to threshold transmission power.

According to an example embodiment of the disclosure, the random access preamble signal is capable of being transmitted a set number of times until the RAR signal is received.

According to an example embodiment of the disclosure, the second tuning value may correspond to a second status different from a first status of the grip sensor (e.g., a grip sensor 410 in FIG. 4) which corresponds to the first tuning value.

According to an example embodiment of the disclosure, the first status of the grip sensor (e.g., the grip sensor 410 in FIG. 4) may include one of grip touch or grip release.

According to an example embodiment of the disclosure, the threshold transmission power may include maximum transmission power usable for transmitting the random access preamble signal.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device, comprising:
- memory storing instructions;
- at least one sensor including a grip sensor;
- at least one antenna;
- a radio frequency (RF) circuit including at least one antenna tuning circuit connected to the at least one antenna; and
- at least one communication processor operatively connected to the RF circuit, wherein the instructions, when executed by the at least one communication processor individually or collectively, cause the electronic device to:

control the RF circuit to transmit a random access preamble signal based on first transmission power and a first tuning value, identify whether a random access response (RAR) signal is received via the RF circuit in response to the random access preamble signal, identify whether the first transmission power is equal to threshold transmission power, based on the RAR signal not being received, change a tuning value of the at least one antenna tuning circuit from the first tuning value to a second tuning value, based on the first transmission power being equal to the threshold transmission power, and control the RF circuit to transmit the random access preamble signal based on the first transmission power and the second tuning value, and wherein the first tuning value is a tuning value used by the at least one antenna tuning circuit in grip status and the second tuning value is a tuning value used by the at least one antenna tuning circuit in grip release status.

2. The electronic device of claim 1, wherein the instructions, when executed by the at least one communication processor individually or collectively, cause the electronic device to:

control the RF circuit to transmit the random access preamble signal a set number of times until the RAR signal is received.

3. The electronic device of claim 1, wherein the threshold transmission power includes maximum transmission power usable for transmitting the random access preamble signal.

4. An electronic device, comprising:

memory storing instructions;

at least one sensor including a grip sensor;

at least one antenna;

a radio frequency (RF) circuit including at least one antenna tuning circuit connected to the at least one antenna; and at least one communication processor operatively connected to the RF circuit, wherein the instructions, when executed by the at least one communication processor individually or collectively, cause the electronic device to:

transit to a radio resource control (RRC) idle (RRC_IDLE) state or an RRC inactive (RRC_INACTIVE) state, and maintain a first tuning value used by the at least one antenna tuning circuit before transition to the RRC_IDLE state or the RRC_INACTIVE, control the RF circuit to transmit a random access preamble signal based on first transmission power and the first tuning value, identify whether a random access response (RAR) signal is received via the RF circuit in response to the random access preamble signal, identify whether the first transmission power is equal to threshold transmission power, based on the RAR signal not being received, change a tuning value of the at least one antenna tuning circuit from the first tuning value to a second tuning value different from the first tuning value, based on first transmission power being equal to the threshold transmission power, and control the RF circuit to transmit the random access preamble signal based on the first transmission power and the second tuning value, and wherein the first tuning value is a tuning value used by the at least one antenna tuning circuit in grip status and the second tuning value is a tuning value used by the at least one antenna tuning circuit in grip release status.

5. The electronic device of claim 4, wherein the threshold transmission power includes maximum transmission power usable for transmitting the random access preamble signal.

6. The electronic device of claim 4, wherein the instructions, when executed by the at least one communication processor individually or collectively, cause the electronic device to:

control the RF circuit to transmit the random access preamble signal a set number of times until the RAR signal is received.

7. The electronic device of claim 4, wherein the instructions, when executed by the at least one communication processor individually or collectively, cause the electronic device to:

turn off the grip sensor after transition to the RRC_IDLE state or the RRC_INACTIVE state.

8. The electronic device of claim 4, wherein the random access preamble signal is capable of being transmitted a set number of times until the RAR signal is received.

9. An operating method of an electronic device, the operating method comprising:

transmitting a random access preamble signal based on first transmission power and a first tuning value;

identifying whether a random access response (RAR) signal is received in response to the random access preamble signal;

identifying whether the first transmission power is equal to threshold transmission power, based on the RAR signal not being received;

changing a tuning value of at least one antenna tuning circuit from the first tuning value to a second tuning value, based on the first transmission power being equal to the threshold transmission power; and transmitting the random access preamble signal based on the first transmission power and the second tuning value, and wherein the first tuning value is a tuning value used by the at least one antenna tuning circuit in grip status and the second tuning value is a tuning value used by the at least one antenna tuning circuit in grip release status.

10. The operating method of claim 9, wherein the random access preamble signal is capable of being transmitted a set number of times until the RAR signal is received.

11. The operating method of claim 9, wherein the threshold transmission power includes maximum transmission power usable for transmitting the random access preamble signal.

* * * * *